United States Patent [19]
McLennan

[11] Patent Number: 5,095,946
[45] Date of Patent: Mar. 17, 1992

[54] DRY-BREAK PIPE COUPLING

[75] Inventor: William R. McLennan, Easton, Pa.

[73] Assignee: Victaulic Company of America, Easton, Pa.

[21] Appl. No.: 738,182

[22] Filed: Jul. 30, 1991

Related U.S. Application Data

[63] Continuation-in-part of Ser. No. 468,351, Jan. 22, 1990, abandoned.

[51] Int. Cl.$^5$ .............................................. F16L 29/00
[52] U.S. Cl. .............................................. 137/614.01
[58] Field of Search ............. 137/614, 614.01, 614.02, 137/614.03, 614.06; 251/304, 305, 309, 149.9

[56] References Cited

U.S. PATENT DOCUMENTS

| | | | |
|---|---|---|---|
| 2,326,143 | 8/1943 | Hufferd | 251/309 X |
| 2,712,454 | 7/1955 | Love | 251/309 X |
| 4,030,524 | 6/1977 | McMath et al. | 251/149.9 X |
| 4,103,712 | 8/1978 | Fletcher et al. | 251/149.9 X |
| 4,135,551 | 1/1979 | Knight et al. | 251/149.9 X |
| 4,271,865 | 6/1981 | Galloway et al. | 251/149.9 X |
| 4,359,066 | 11/1982 | Hunt | 251/149.9 X |
| 4,438,779 | 3/1984 | Allread | 251/149.9 X |
| 4,664,149 | 5/1987 | Fremy | 137/614.06 |
| 4,809,747 | 3/1989 | Choly et al. | 137/614.06 |
| 4,936,547 | 6/1990 | Obst | 251/304 X |

Primary Examiner—Martin P. Schwadron
Assistant Examiner—Kevin L. Lee
Attorney, Agent, or Firm—Abelman Frayne & Schwab

[57] ABSTRACT

A dry-break pipe coupling includes a valve body and a quarter turn rotary valve such as a butterfly valve, plug valve, ball valve and the like, the valve body and the contained valve having been split transversely in a direction intersecting the Y—Y axis of rotation of the valve into two separate valve body and valve portions that are rotatable about an axis concentric with or closely proximate to the Y—Y axis of the body, the valve portions being separable one from the other when the valve is in a closed position, the respective valve body portions each providing rotational support for the valve portion associated with that valve body portion.

20 Claims, 14 Drawing Sheets

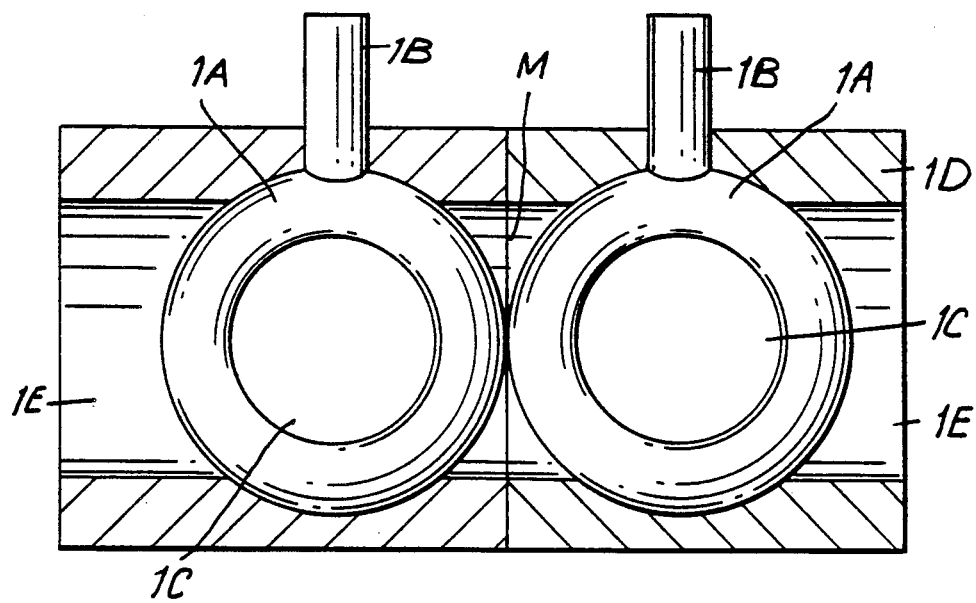
FIG. 1
PRIOR ART
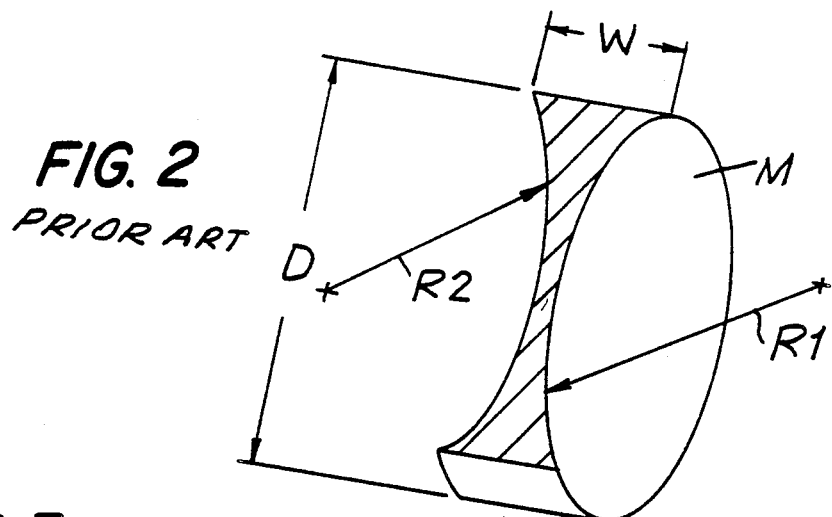
FIG. 2
PRIOR ART
FIG. 3
PRIOR ART
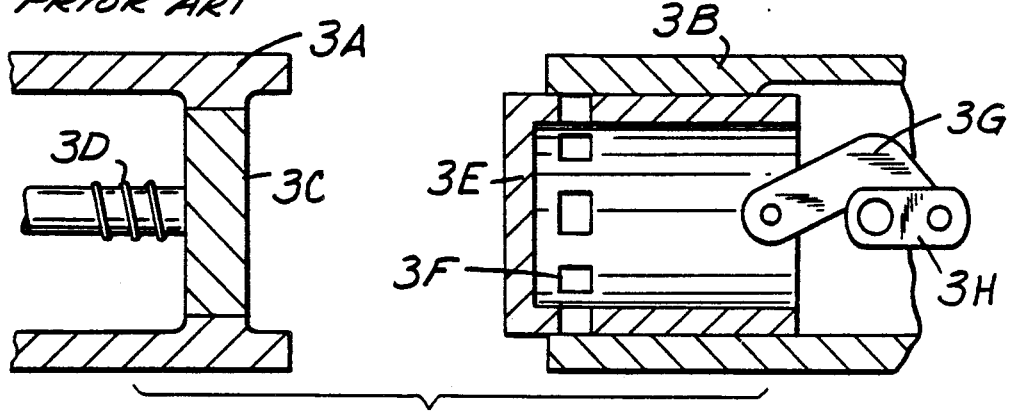

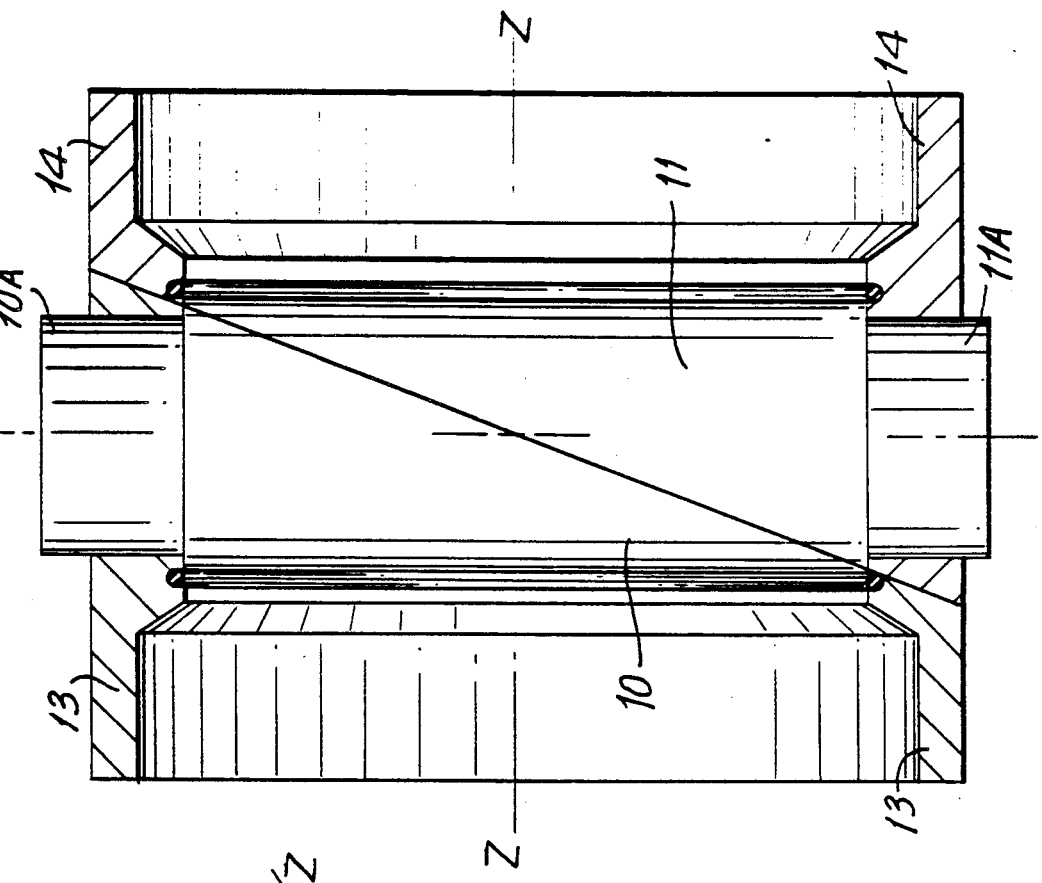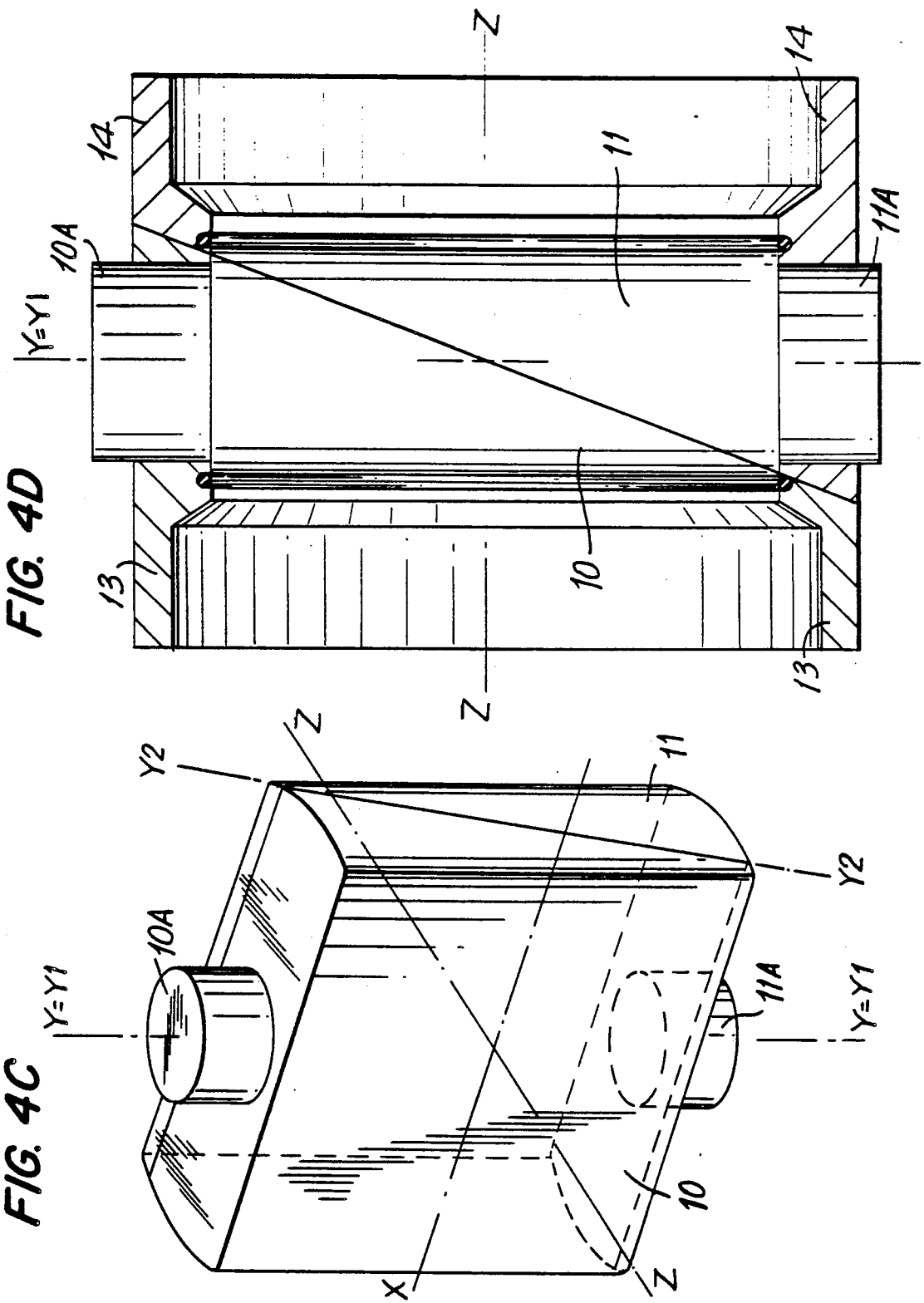

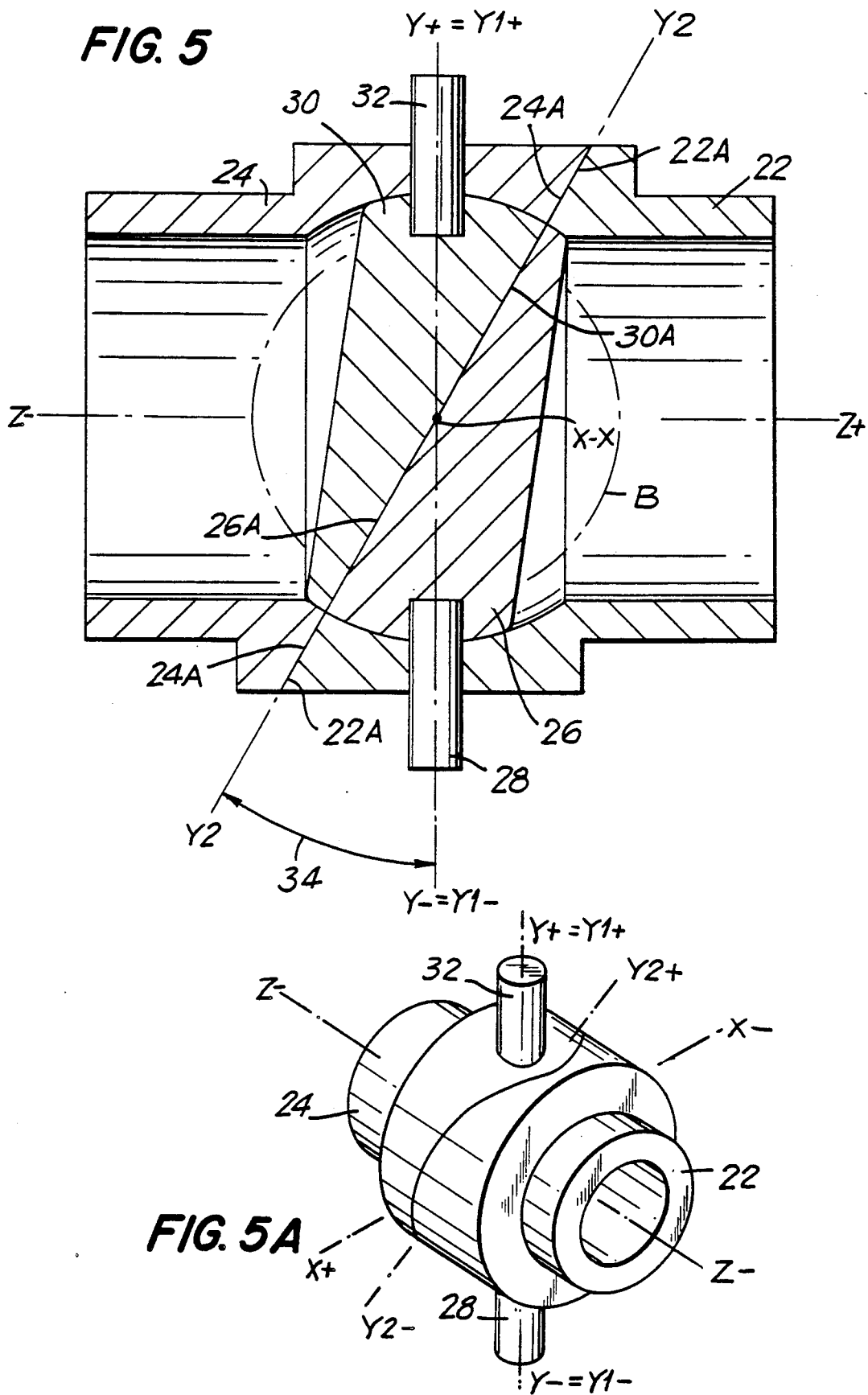

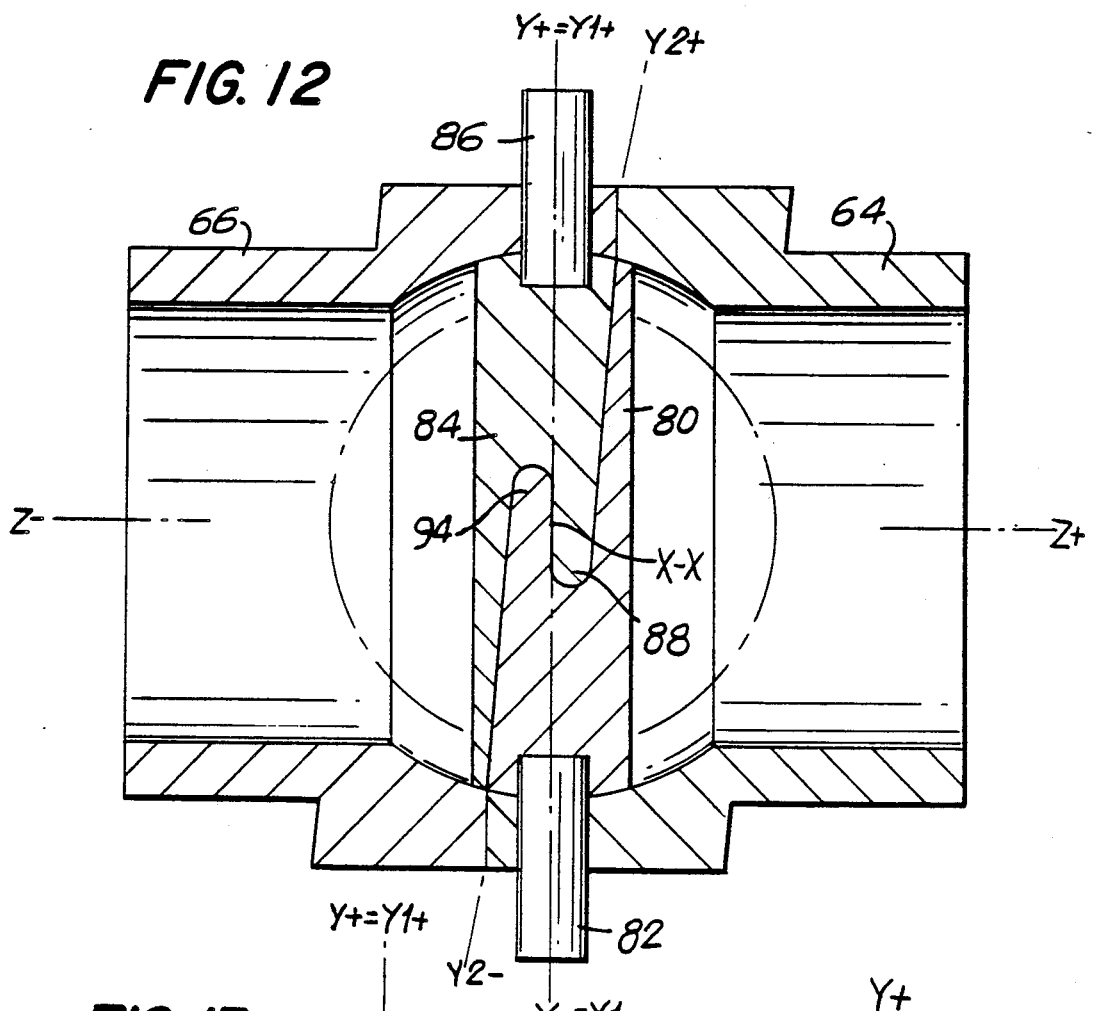
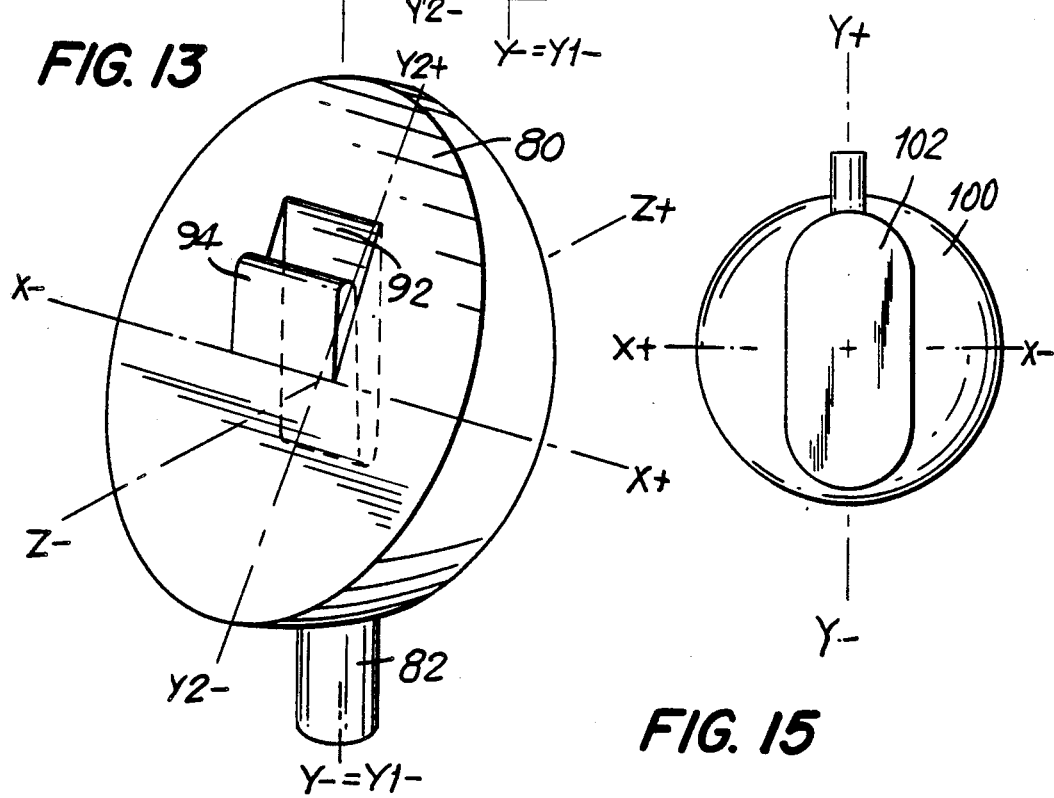

DRY-BREAK PIPE COUPLING

FIELD OF THE INVENTION

This application is a continuation-in-part of application Ser. No. 07/468,351, filed Jan. 22, 1990, now abandoned.

This invention relates to a separable coupling of particular use in interconnecting lengths of hose or rigid piping used for conveying flammable liquids and gasses, such as gasoline, aviation fuel, kerosene, gasohol, diesel or fuel oil, natural gas, propane, and the like, and in any other application in which spillage of the conveyed liquid or gas is to be reduced to the smallest possible amount, and preferably zero definable volume of the conveyed liquid or gas upon the separation of the respective halves of the coupling.

Such couplings find application in the assembly of temporary fuel lines to aircraft, motor vehicles, ships and the like, the necessary supply line being established by connecting an appropriate number of hoses or pipelines one to the other, and then connecting the assembled hose or pipe line to a nipple provided as a fixture on the aircraft, motor vehicle, ship or the like.

Throughout the discussion of this invention, the term "coupling half" is used to denote either a coupling half which is configured and specifically adapted for connection to the end of a hose or pipeline, or, a nipple that is specifically intended to be a fixture providing an outlet for a supply tank, or, a fixture providing an inlet to a storage tank.

While the invention is specifically related to the conveying of gasoline or other flammable liquids, it is not limited to such applications, but also finds application in the handling of valuable materials, or the handling of toxic or noxious substances, including sewage sludge, caustic or acidic materials, fluid suspensions of insecticides, infectious materials, radioactive materials, chemicals and solvents or any other application in which spillage of the fluid material is to be minimized to the greatest possible extent upon separation of the halves of the separable coupling.

A requirement of control valves used in such applications is that they must provide a tactile feel and a visual indication of the position of rest of the valve member, that will indicate to an operator whether the control valve is in a closed, an opened, or an only partially opened condition. The standard in the industry is that of an actuating lever that extends transverse to the flow path when the valve is in a fully closed position and generally perpendicular thereto, and which extends inline with the flow path when the valve is in a fully opened position. Such an arrangement is commonly known in the industry as a quarter turn valve, i.e., a valve that requires rotation through an angle of 90° in order to move it between its fully opened position and its fully closed position.

BACKGROUND OF THE ART

A general requirement of such couplings is that the respective halves of the coupling each incorporate a valve that can be opened when the coupling halves are properly connected one to the other, and, which must be moved to a fully closed condition before the respective halves of the coupling can be separated one from the other. This is in order that fluid material present in the respective hoses, pipes or nipple, and which probably is under pressure, shall remain trapped within the hose, pipe or nipple and restrained against spillage upon separation of the coupling halves. In some circumstances, such as the top filling of storage tanks, only one of the couplings may be required.

The provision of such valves, while relatively simple in basic concept, poses unusual problems in the reduction to practice of that concept. Only the smallest possible amount and preferably zero of the flammable or noxious liquid can be permitted to remain trapped between the respective valves when the valves are in their closed position, in that the trapped liquid will be released to atmosphere or spilled onto the ground upon the separation of the coupling halves.

A desirable requirement is that the interconnecting members of the respective coupling halves be identical with each other in all respects, in order that any one coupling half can be connected to any other coupling half or to a corresponding connecting nipple, i.e., that the coupling halves be "sexless" or hermaphroditic in all respects, to the total avoidance of male only coupling halves and female only coupling halves. Dissimilar coupling halves carry the penalty that only one selected of a hose can be connected to a corresponding selected one end of another hose, or, to a corresponding selected nipple. Reversal of the ends of a hose having dissimilar coupling halves at its respective ends would preclude the assembly of that hose to another hose or nipple having interconnections corresponding with that at the said one selected end of that hose.

Preferably, some form of locking mechanism is provided that precludes separation of the coupling halves until such time that the respective valves have been moved to their fully closed position, and which permits separation of the coupling halves only when the respective valves have reached their fully closed position.

A coupling that goes a long way to meeting these conditions is the one disclosed in U.S. Pat. No. 4,438,779, to Allread, issued Mar. 27, 1984.

The coupling of that patent fully meets the conditions of identical coupling halves that are locked in assembled condition until each of the contained valves separately are moved fully to their closed position, but only partially meets the requirement that the smallest possible amount of flammable or noxious liquid shall remain trapped between the respective valves upon closure of the valves.

In that patent, ball valves are employed as the respective closure valves, the ball valves each being rotatable about an axis perpendicular to the longitudinal axis of a cylindrical port extending through the associated ball.

Provision is made for the sealing of the respective coupling halves to each other and to the associated ball valves on diameters that closely approximate the diameter of the through port in the respective balls. However, in order to permit closure of the ball valves, they must be positioned with their centers spaced by a distance which is not less than one half the combined diameters of the ball valves. This is in order to permit rotation of the respective ball valves to their closed position.

Such a construction, however, results in a void in the form of a double meniscus between the respective ball valves when in their closed position, the meniscus having a diameter that is the same as or greater than the diameter of the through port in the respective ball valves, and having opposite concave curvatures represented by the respective outer spherical faces of the respective valves.

As will be appreciated, the greater the diameter of the through ports and thus of the ball valves, then, the greater will be the contained volume of the meniscus, and, the volume of the liquid that is released to atmosphere or spilled upon separation of the coupling halves. For a typical coupling of 1.5 inches bore diameter, this can result in the release to atmosphere and spillage of two or more fluid ounces of the flammable or noxious liquid, a condition which obviously is to be eliminated if at all possible, when handling flammable, toxic, or noxious materials.

An alternative form of dry break coupling has been disclosed in U.S. Pat. No. 4,271,165, Galloway et al. issued June 9, 1981 which overcomes to the greatest possible extent the problems of spillage upon separation of the coupling halves, but, only at the expense of imposing a very considerable resistance to fluid flow through the assembled coupling, and, the requirement to provide dissimilar and complex male and female coupling halves.

In this patent, poppet valves are provided within the respective coupling halves. The poppet valves are supported for movement axially of the fluid flow passages. After the closure and locking of the coupling, one of the poppet valves is manually moved axially in a direction to displace the other poppet valve axially, and, to open fluid flow passages extending through the first poppet valve.

The poppet valves have planar faces that engage one another. Thus, theoretically, zero volume is left between the mating faces.

However, this advantage is obtained only at the combined disadvantages of providing dissimilar coupling halves, that imposing a very high frictional drag on the fluid flow and throttling of the fluid flow as it passes through the coupling, and that of providing couplings of considerable size, weight, and manufacturing cost.

Throttling of the fluid flow as it passes through the coupling results in an increase in transfer time and in turn produces a requirement for pumps of increased power for the transmission of the flammable or noxious fluid, and, requires seals in the coupling halves that are capable of withstanding the enhanced pumping pressure.

Another form of dry break coupling is disclosed in Cooper, U.S. Pat. No. 3,106,223, issued Oct. 8, 1963. Cooper, however, cannot meet the industry standard requirement that only a 90° turn of the operating shaft of the valve is required to move the valve between fully opened and fully closed positions. In the Cooper construction it is required that the operating shaft of the valve be rotated through a full 180° in order to move the valve between a fully opened and a fully closed position. Thus, in Cooper, the valve actuating lever, if provided, will extend either transverse to, or, in line with the flow path of the coupling, without regard to whether the valve is opened or closed.

SUMMARY OF THE INVENTION

It is an object of this invention to provide a novel form of butterfly valve, having particular utility in couplings of the separable type, and which can be employed to provide a true dry-break coupling, in which zero or an insignificant minimum of spillage of the conveyed fluid occurs upon separation of the coupling halves.

It is also an object of this invention to provide such a coupling that meets the industry's standard of providing a valve that is moved nominally one quarter turn, and through nominally 90° between its fully open and fully closed positions, in order to provide the required tactile feel and visual indication of the position of the valve member.

While an actual rotation of 90° or one quarter turn is the most preferred, the actual angle of rotation can be exceeded by up to 10° in both directions in order to accommodate manufacturing tolerances and design considerations, provided that a clear indication is given of the position of the valve. For example, after having moved the valve to its required position, a slight additional movement of the valve actuating lever possibly will be required in order to engage a locking mechanism for the valve actuator. Additionally, if due to manufacturing tolerances, the valve actuating shaft is other than truly perpendicular to the axis of the flow path through the coupling and coaxial with the Y—Y axis, then, a minor further movement of the valve actuating lever beyond the quarter turn or 90° may be required to fully open or fully close the valve.

Thus, the object of this invention is to provide a coupling in which the valve actuating lever nominally extends transversely of the flow path when the valve is in a closed position, and one in which the valve actuating lever nominally extends in the general direction of the flow path when the valve is in a fully opened position, but not necessarily truly parallel to the flow path.

Another object of this invention to provide a separable coupling for establishing hose to hose connections or hose to nipple connections, in which the residual void present between the respective closure valves, when in their closed position, is reduced to an insignificant minimum and up to the point of total elimination.

Another object of the invention is to retain the desirable advantages of "sexless" or hermaphroditic couplings of a configuration identical one to the other, and which will permit the assembly of any one coupling half to any other coupling half, or, to any other structure provided with such a coupling half.

It is a further object of this invention to provide a separable coupling in which restraint on fluid flow through the coupling is minimized to the greatest possible extent.

A further object of this invention is to provide a separable coupling which provides for extreme ease of servicing and cleaning in the event that such is required, and, one which is of elegant simplicity and which is resistive to damage caused by rough handling of the respective coupling halves.

In larger sizes providing for high rates of fluid flow, the coupling halves will be of substantial weight, even though of considerably less weight than comparable couplings as known in the art, and are thus prone to being accidentally dropped. Also, commonly such couplings are to be employed in hostile environments, such as desert, beach conditions, or field conditions with the possibility that the coupling half will be dropped into sand, dirt or mud. If this should happen, the coupling of the invention can be cleaned off by the workman merely by wiping contaminants from the operative face of the coupling.

Further, it is an object of this invention to provide a separable coupling than can operate at elevated pressures.

According to one aspect of the invention, a composite valve of the butterfly valve type is provided by dividing a conventional butterfly into two valve portions in the direction of the transverse X, Y plane of the butterfly valve. The division can be in one or more surfaces that are planar, or, of any other configuration, the requirement being that the surfaces of division are contained entirely within the body of the conventional butterfly valve, and, that they extend through the axially extending periphery of the butterfly valve at a location intermediate the side faces of that valve.

The butterfly valve itself can be in the form of a diametral chord of a cylinder, or, can be diametral chord of a sphere, or, a diametral chord of any other solid that is rotatable about a fixed axis.

In its simplest form, the composite valve will be provided by two identical plates arranged in juxtaposition, each of the plates having a stub shaft integral with or rigidly attached thereto, the respective stub shafts extending oppositely one from the other and being arranged with the longitudinal axis of the respective stub shafts coaxial.

The plates can be of rectangular form, or circular form, or of any other shape, including an irregular shape, that is rotatable about a fixed axis.

The engaged side faces of the plates can lie in the X, Y plane, or, lie parallel thereto, or, be arranged at an angle of the X, Y plane.

The stub shafts can be affixed to the plates either at their outer periphery and on a diameter thereof, or, at a position spaced inwardly of their outer periphery and arranged at an acute angle to the medial plane of the associated disk.

Such an arrangement of the valve portions permits one of the valve portions to be incorporated into one half of a coupling for it to close a fluid flow passage through that coupling half, and, the other of the valve portions can be incorporated into the other half of a coupling for it to close a fluid flow passage through the other coupling half.

When the two coupling halves are brought together, then, the two valve portions can be rotated conjointly about their coaxially aligned stub shafts to open the fluid flow passage through the assembled complete coupling.

The respective coupling halves are each provided with a valve seat for cooperation with the periphery of the associated valve portion, and, which is identically configured to the outer periphery of the associated valve portion. Appropriate sealing members can be provided on the periphery of the associated valve portion, or on the valve seat, or, on both of those members.

The valve seats can be in the form of an axially short and axially straight surface, or, those valve seats can be in the form of a cylindrical surface, or, be in the form of a spherical surface, or as dictated by the surface developed by the composite valve upon rotation thereof about the axis of the respective stub shafts.

A preferred form of coupling according to the present invention has the form of a conventional butterfly valve with the valve disk in the closed position, that has been cut through the housing, valve disk, and valve stem on an inclined plane extending through the housing, through the periphery of the valve disk and the body of the valve disk. As will be explained later, such a plane or surface can commence in either the Z+ or Z− direction and translate through the Y—Y axis to the Z− or Z+ direction, i.e., it traverses the X, Y plane that includes the Y—Y axis of rotation of the valve disc.

This provides coupling halves that are entirely complementary one to the other at the cut face, and which can be attached one to the other by any suitable connecting means to restore the butterfly valve to its initial configuration. When so secured one to the other, the coupling members and the contained valve disk provide, theoretically zero free space between the ends of the coupling members and zero free space between the juxtaposed side faces of the valve disk. Any attempted seepage of the conveyed fluid can be eliminated by providing suitable seals on the end faces of the coupling members and on the side faces of the respective halves of the valve disk.

While it is required that theoretically zero free space exists between the juxtaposed side faces of the valve disk, in certain configurations of the valve disks, such as opposite outward dishing thereof, will leave a free space between the respective valve portions. That free space will, however, be completely sealed by seal members extending between the side faces of the respective valve disks.

After separation of the respective coupling halves, the respective coupling halves each retain their ability to close-off and seal the flow passage extending through the associated coupling half.

When the coupling halves are reassembled one to the other, then, rotation of the valve stem associated with one of the coupling halves (or simultaneous rotation of the valve stems associated with both of the coupling halves) will produce rotation of the then "split" valve disk in an entirely usual manner between its closed position and an open position, and subsequently reversely, or forwardly through 360°, to a closed position. The butterfly valve, when the coupling halves are correctly assembled and secured one to the other, thus will operate in a manner no different from that of a conventional butterfly valve.

However, subsequent to closure of the butterfly valve of the present invention, the respective coupling halves can then be detached one from the other, and this in the total absence of any definable volume of the conveyed liquid trapped between the respective coupling halves.

In this manner, the present invention provides a butterfly valve that can be operated in a single operating motion, that operates as a true dry-break coupling eliminating spillage of the conveyed fluid, and which additionally eliminates all of the complexities of prior known dry-break couplings and the weight penalty and cost disadvantages thereof, while at the same time eliminating the disadvantages of the known ball valve couplings, and also, eliminating the necessity for independently operable dual ball valves as known in the art and the disadvantages resulting from the use of such ball valves.

This elegant simplicity of the coupling of the present invention, as will appear from the following discussion, also provides manifest advantages in the cleaning and servicing of the valve should such actions become necessary.

The center of rotation of the valve disk will lie on the longitudinal axis Z—Z of the coupling, and, the axis of the valve stem will lie in a Y,Z plane. The axis of the valve stem does not necessarily have to be positioned in the X,Y plane of the coupling, i.e., a transverse plane perpendicular to the Z—Z axis. If it is so positioned, then, the end faces of the coupling halves will be arranged at an angle to the X, Y plane. Equally well, the end faces of the coupling can be positioned in the X, Y plane, and, the axis of the valve shaft be displaced angularly in the Y—Z plane about the center of rotation of the valve disk.

The invention also contemplates geometric configurations of the juxtaposed faces of the valve disks that are other than truly planar. Planar surfaces are preferential in that they facilitate the ease of sealing of the valve disks associated with the respective coupling halves. However, any other configuration of severage can be employed, provided that the configuration of severage of one of the coupling members is duplicated identically on the other coupling member, but in mirror image or reverse. The only requirement is that, when the respective coupling halves are correctly presented one to the other, they will assume the configuration of a conventional disk valve.

While it is preferable that the thusly formed side faces of the valve disks, (of which there are now two) are planar, it is not essential that the side faces of the valve disks be truly planar. They can be provided with interlocking excrescences and recesses, and in fact be of any form that will inter-fit upon the correct presentation of the coupling halves one to the other.

As is conventional in the art, the valve disk can be rotatable in spherical surfaces formed in the respective coupling halves, or, as also is usual in the art, they can be rotatable in cylindrical surfaces provided in the respective valve halves.

Further, the respective valve members do not necessarily have to be circular in plan form. They can be of any shape, including that of an ellipse having its major and minor axis passing through the center of rotation of the valve disk, or, in the shape of a square, rectangle, polygon or combinations of rectilinear and curved sides. However, as the couplings of the invention are not in practice produced by splitting a conventional butterfly valve, but instead are formed identically and separately one from the other, the need arises that the configuration on one side of the X-Z plane be duplicated in reverse on the opposite side of that plane. This is because identically formed coupling halves will require rotation of one of the coupling halves through 180° about the X—X axis in order for the respective coupling halves to be presented correctly to each other, and, for them to "mate" with the longitudinal axis of the respective stub shafts or half shaft portions in coaxial alignment with each other.

The manner of securing the coupling halves one to the other can be in any selected manner, including traction bolts, wedging surfaces, toggle clamps etc., that can meet the requirement of the respective coupling halves being secured one to the other with the Z—Z axis of the respective coupling halves coincident and the axis of the respective half shafts coincident and positioned in the Y+Z plane of the assembled coupling.

DESCRIPTION OF THE DRAWINGS

The invention will now be described with reference to the accompanying drawings which illustrate preferred embodiments of the present invention, and in which:

FIG. 1 is a diagrammatic illustration of the ball valve arrangement known from U.S. Pat. No. 4,438,779;

FIG. 2 is a diagrammatic representation of the volume of liquid that is released to atmosphere or spilled on the ground when using this prior art construction;

FIG. 3 is a diagrammatic illustration of the prior art construction of U.S. Pat. No. 4,271,865;

FIGS. 4A through 4H are diagrammatic illustrations of valve members providing a composite butterfly valve in accordance with the teachings of the present invention;

FIG. 5 is a diagrammatic cross-section through a separable coupling incorporating a butterfly valve according to the present invention;

FIG. 5A is a perspective view similar to FIG. 4A, and illustrating the orientation of the respective axes of the separable coupling of FIG. 5;

FIG. 12 is a diagrammatic cross-section through an alternative form of separable coupling according to the present invention;

FIG. 13 is a perspective view showing a side face of one of the valve disk members of FIG. 12;

FIG. 15 illustrates an alternative form of valve disk that has application in the separable coupling of the present invention;

BRIEF DESCRIPTION OF THE PRIOR ART

Figure 4B:
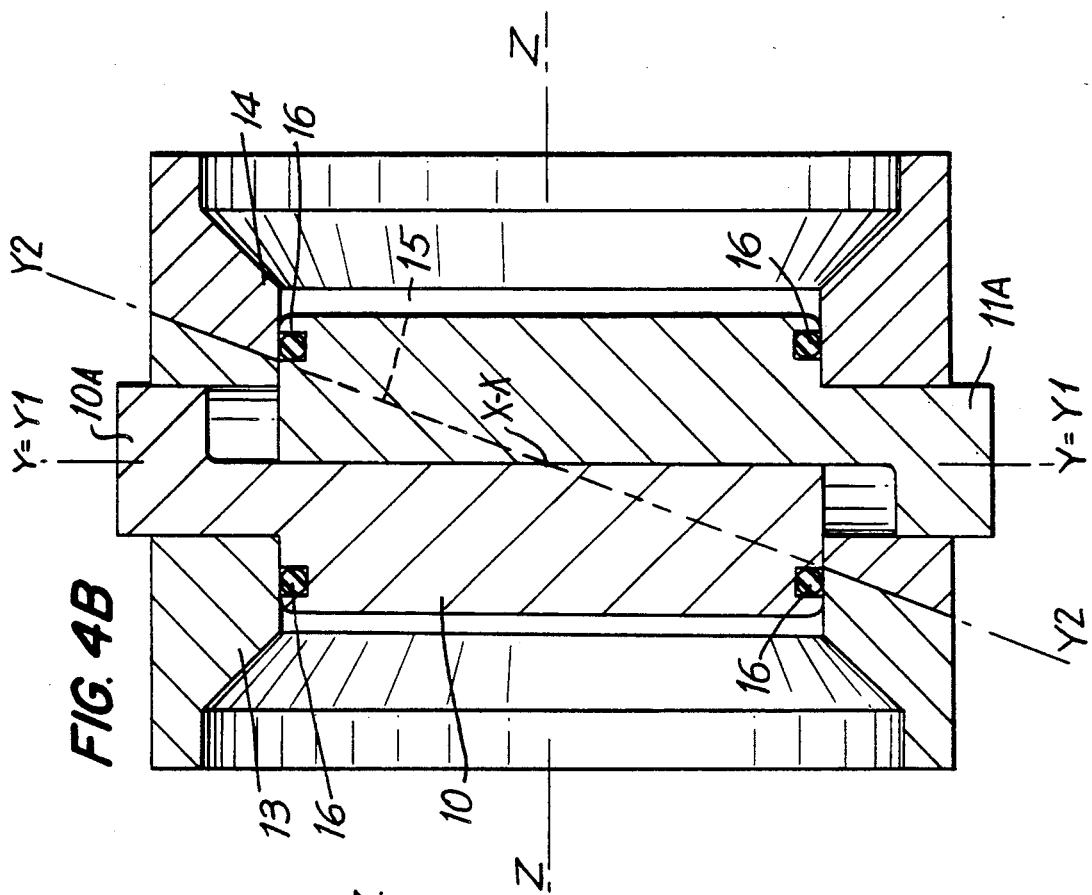

Referring firstly to FIG. 1, this illustrates diagrammatically the basic construction of a ball valve controlled separable coupling according to Allread U.S. Pat. No. 4,438,799.

The basic Allread construction is that of two separate ball valves 1A, 1A, each having a shaft 1B connected rigidly thereto and which is used for rotating the associated ball, the respective balls each having a central flow passage 1C. The respective balls are contained in housing members 1B, 1D that are connected to each other with their respective flow passages 1E, 1E in axial alignment. The valve in FIG. 1 is illustrated in a closed position, i.e., the respective flow passages 1C, 1C have been rotated through 90° for them to extend perpendicular to the longitudinal axis of the respective housings 1D. To open the passages 1E to through-flow through the separable coupling, the respective ball valves 1A, 1A, each are rotated through an angle of 90° to bring their through passages 1C, 1C into axial alignment with the axis of the flow through passages 1E, 1E.

However, ball valves 1A, 1A are spaced one from the other in the direction of the flow-through passage 1E, 1E. While this poses no problem during use of the separable coupling, it does pose a very significant problem upon closure of that coupling.

As will be observed in FIG. 1, and as is illustrated diagrammatically in FIG. 2, upon rotation of the ball valves 1A, 1A to the closed position, then, there exists a double concave void M between the respective ball valves, the volume of the void M being dependent on the axial length of the void, the diameter of the void, and, the radius R1, R2 of the respective ball valves.

While, as in Allread, every effort is made to minimize the volume of the void M, it is impossible to eliminate that void, in that the respective ball valves 1A, 1A must spaced from each other by a distance which is at least equal to R1+R2, or greater, this being complicated by the fact that any seals surrounding the respective ball valves must lie on a diameter that is at least equal to and usually greater than the diameter of the respective through passages 1C, 1C.

The volume of the void can be calculated by the following formula, in which a is the radius of the outer periphery of the void, h is one half the axial length of the void, and V is the volume of one half of the void:

$$\text{Volume of one half of the void} = V = a^2h - h\left(\frac{a^2}{2} + \frac{h^2}{6}\right) =$$

$$h\left(\frac{a^2}{2} - \frac{h^2}{6}\right)$$

where $$b = \frac{a^2 + h^2}{2h}$$

is the ball valve volume. Typically, b/a=1.6.

From this formula, it can be derived that the volume of the void is 42.8% of the volume of a cylinder having a diameter 2A and an axial length 2H. In a typical coupling, the void represents an appreciable volume of flammable or noxious that is spilled upon separation of the respective coupling halves 1B, 1D.

While the Allread construction is encumbered with this disadvantage, it also has the very desirable attribute that the respective coupling halves can be made identical one with the other in an asexual or hermaphroditic configuration, in which any one coupling member will interfit with any other coupling member of the same diameter.

Referring now to FIG. 3, there is illustrated diagrammatically a coupling as proposed in U.S. Pat. No. 4,271,165, Galloway et al. This patent teaches the provision of two totally different coupling members 3A, 3B, which are connectible to each other, one of the coupling members, 3A, incorporation a poppet valve 3C which is moveable against the bias of a spring 3D to an opened position. The other coupling member, 3B incorporates a pusher mechanism 3E having flow-through passages 3F, and, which can be moved between a retracted and an advanced position by a toggle linkage 3G, 3H. On connection of the respective coupling halves 3A and 3A, the juxtaposed faces of the poppet valve 3C and the end face of the plunger 3E meet in face engagement, thus providing theoretically zero free space between the respective members. Thus, upon subsequent separation of the respective coupling halves, theoretically zero volume of the flammable or noxious liquid is present between the juxtaposed faces of the respective members 3C and 3E, and, there is theoretically zero spillage of that liquid.

However, this advantage is obtained only at the expense and weight of highly complex and totally dissimilar male and female coupling halves.

DISCUSSION OF THE BASIC CONCEPTS OF THE INVENTION

Figure 4A:
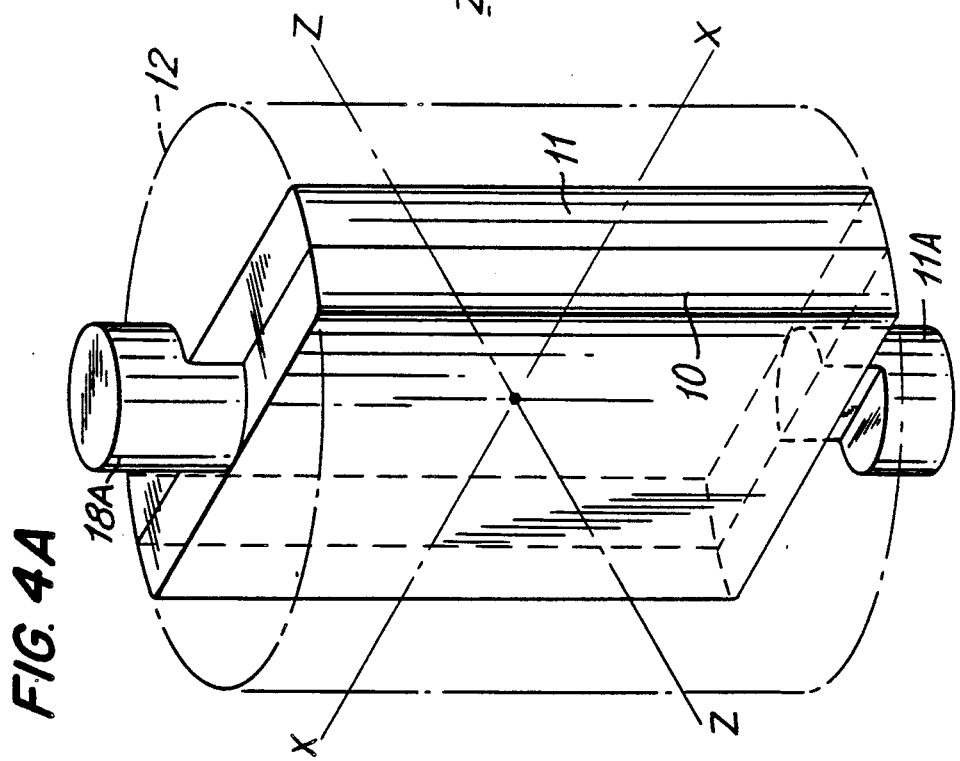

Referring now to FIG. 4A, there is illustrated what is possibly the simplest form of the invention, which is that of a hybrid form of cylindrical rotatable plug valve which has been bisected in the X,Y plane.

In FIG. 4A, two identical plates, two identical plates 10, 11 of rectangular shape are positioned in face to face relationship, the vertical edges of the plates being curved on the radius of a cylinder 12.

The respective plates 10 and 11 each have a stub shaft 10A, 11A, rigidly affixed to the associated plate 10 or 11 and which is entirely free of the juxtaposed plate. The respective stub shafts are positioned with the longitudinal axis of that shaft coincident with the Y—Y axis of the cylinder 12, and, which is also the axis of revolution of the plates 10 and 11.

The cylinder 12 defines seating and sealing surfaces provided within the respective coupling halves, those surfaces being intersected by the fluid flow passage through the respective coupling halves along the axis Z—Z.

The plates 10 and 11 are shown as planar with their juxtaposed faces extending in the X,Y plane and transverse to the Z axis, i.e., in the closed position of the valve.

If now one of the stub shafts 10A or 11A is rotated, this will cause conjoint rotation of both of the plates 10 and 11 out of the X,Y plane and towards the Y,Z plane, i.e., towards the open position of the valve.

This rotation is readily permitted by the coincidence of the axis of the respective stub shafts with the axis of generation of the cylinder 12.

If now one of the stub shafts 10A is journalled for rotation in one half of a separable coupling, and the stub shaft 11A is journalled for rotation in the other half of the separable coupling as illustrated in 4B, then, upon return movement of the plates 10 and 11 to the initial XY plane, the respective coupling halves, indicated at 13 and 14 in FIG. 4B can be removed one from the other with the associated plate 10 or 11 closing the through passage in that coupling member.

As illustrated in FIG. 4B, the respective coupling halves 13 and 14 are divided along a plane 15 which is inclined to the X,Y plane. Thus, and as illustrated in FIG. 4B, the coupling half 14 with its captive valve member 11 sealing the flow-through port in that member can be removed bodily leaving the flow-through passage of the other coupling half closed by the valve member 10. Conveniently, seal members 16 are interposed between the respective valve members 10 and 11 and their associated coupling halves 13 and 14.

Thus, in the embodiments of FIGS. 4A and 4B, a construction is arrived at which is that of a rotatable plug valve that has been split vertically to provide two halves of the plug valve, the plug valve being devoid of the usual flow passage extending through a plug valve.

Proceeding further from the concept of FIGS. 4A and 4B, if the coupling halves are to be split in the X,Y2 plane, then, it is more convenient if the plates also are split in that plane, as illustrated in FIGS. 4C and 4D in which the same reference numerals have been used to identify to those parts in common with FIGS. 4A and 4B. Splitting the composite valve along the X,Y2 plane, results in end faces of the coupling member which are smooth and uninterrupted when the valve is in its closed position, the respective side faces each extending in the same plane as the ends of the coupling halves. Further, this arrangement is far more convenient in that it allows the stub members 10A and 11A to be attached directly to their associated valve members 10 and 11 throughout the entire cross-sectional area of the stub shafts 10A and 11A.

Figure 4F:
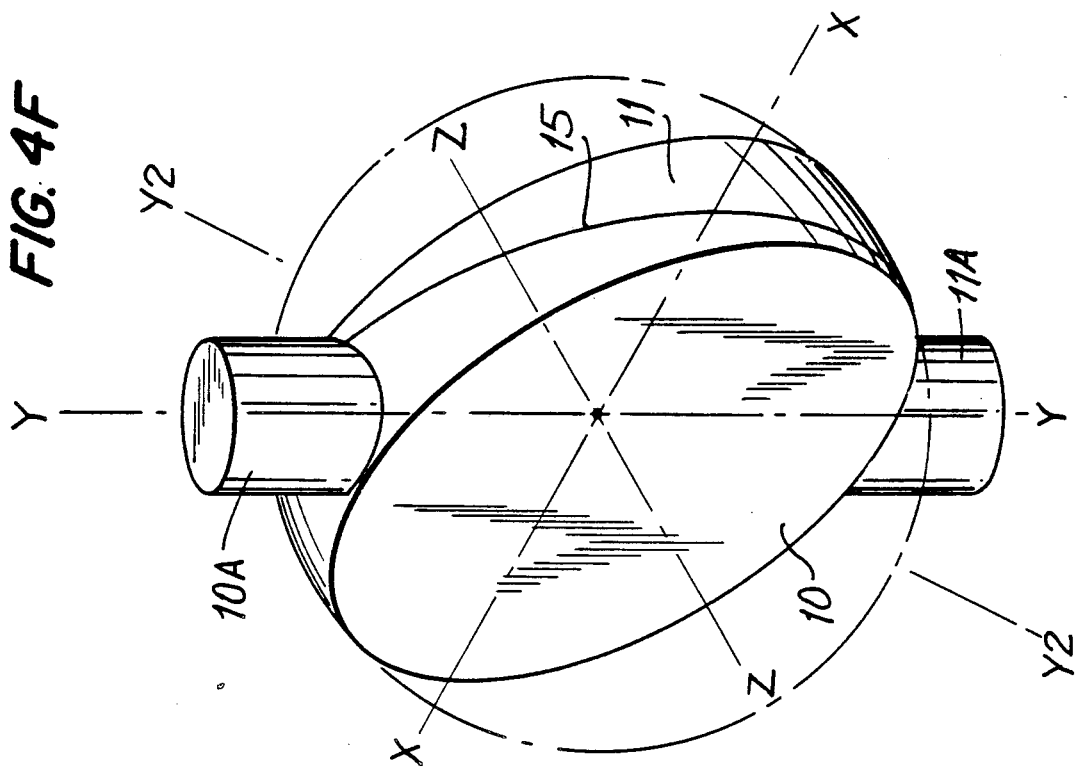
Figure 4E:
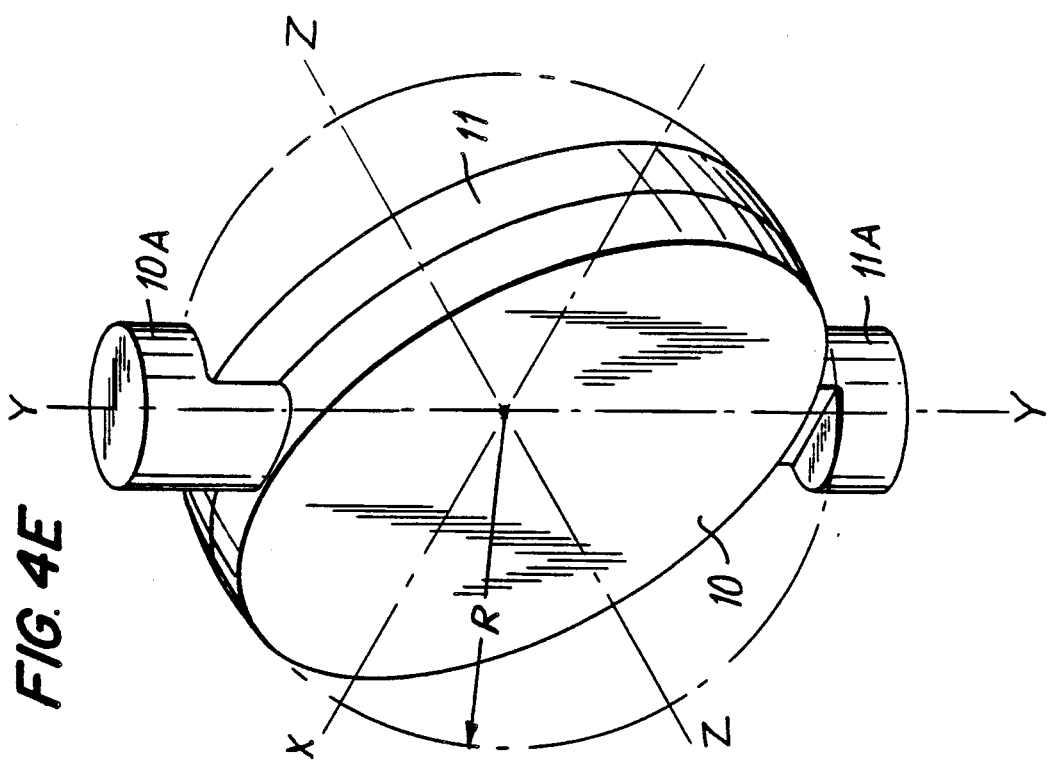
Figure 4H:
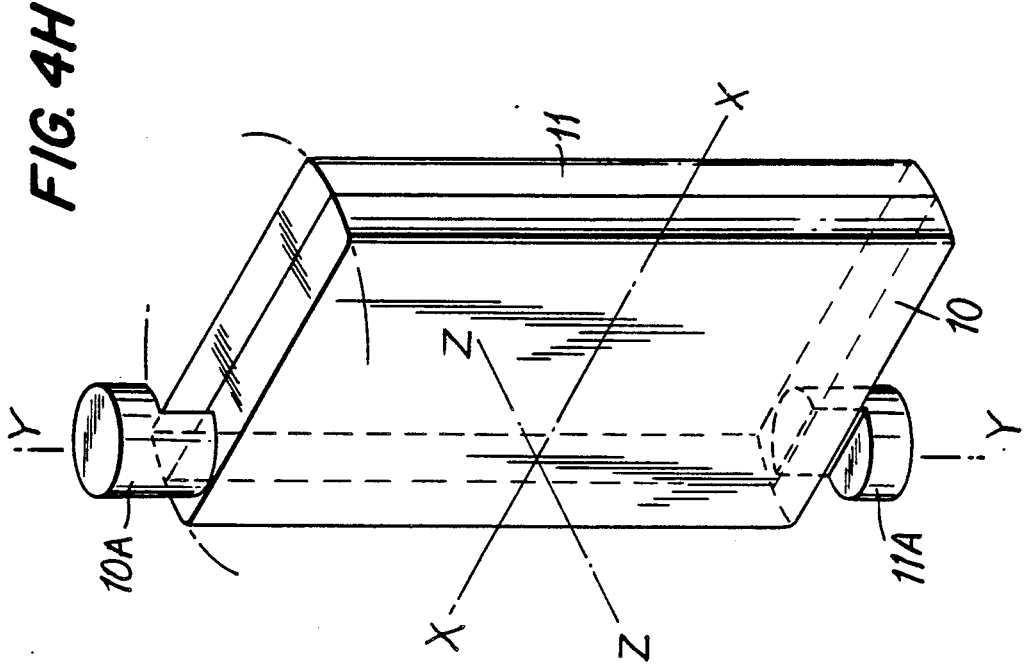

Up to this point, the basic concept has been described with reference to a split cylindrical plug valve having a single radius of curvature generated from the Y—Y axis. The next step in the development of the basic concept is the conversion of the cylindrical form of valve of FIGS. 4A through 4D into the form of a sphere generated from a radius from the center of the X,Y and Z axes, as illustrated in FIG. 4E. FIG. 4E illustrates a valve comprised of chords of a sphere, the surface of division lying in the X-Y plane, as it is in FIGS. 4A and 4B. In FIG. 4E and FIGS. 4F and G the same reference numerals have been employed to identify the corresponding parts to those illustrated in 4A through 4D.

The next step in the development of the basic concept is the formation of the chord segment of the sphere along an inclined X-Y2 plane as has been discussed with respect to FIG. 4D to produce the same advantages as those discussed with respect to FIG. 4D.

Figure 4G:
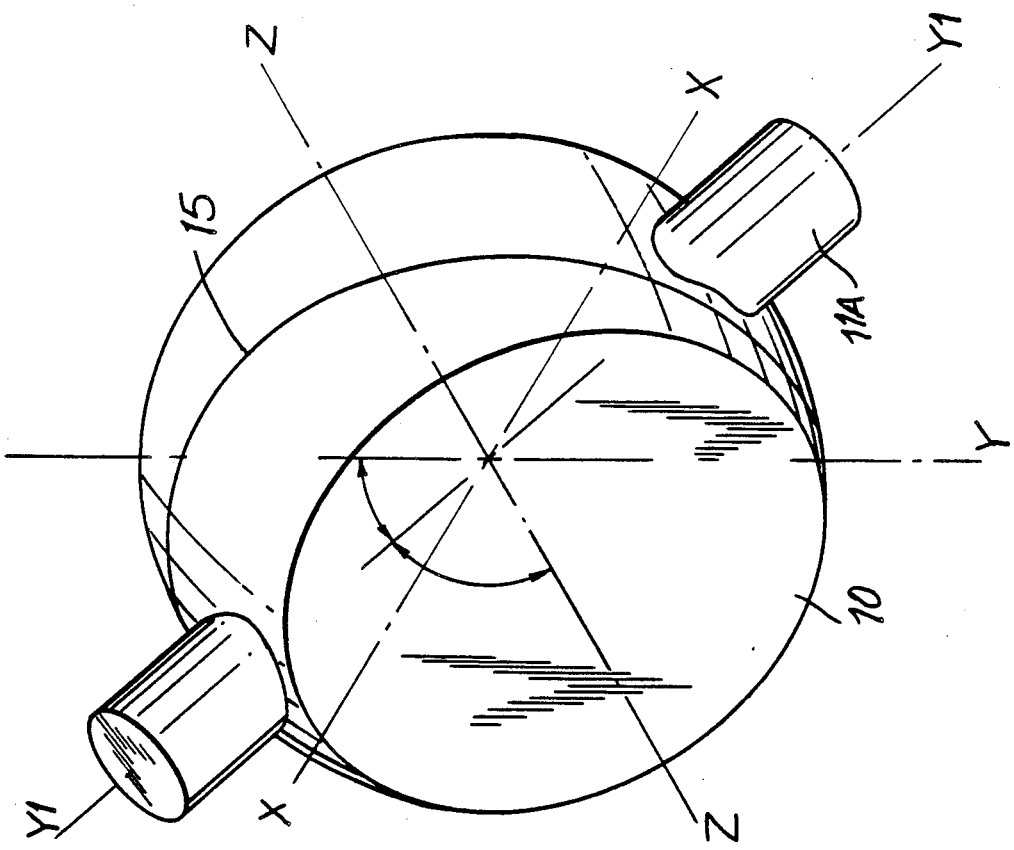

Proceeding further, and as illustrated in FIG. 4G, by removing one side of the valve member of FIG. 4A, a separable composite flap valve can be provided having all of the attributes of the structure of FIG. 4A.

Thus, in basic concept, the invention relates to any solid which is rotatable about an axis, in which the surface of division extends completely within that solid and extends through the periphery only of that solid.

Proceeding now from this discussion of the basic concepts of FIGS. 4A through 4G, practical embodiments of separable couplings are now discussed which include those concepts.

Referring now to FIGS. 5 and 5A, a separable coupling is provided which includes separable coupling halves 22 and 24, each of which includes a valve, which is so configured that the respective coupling halves can be offered up to each other with their respective closure valves in a closed position, subsequent to which the respective valve halves can be rotated in unison between an open and a closed position.

In FIG. 5, one coupling half 22 is provided with a valve disk 26, to which is rigidly attached a stub shaft 28. The other coupling half 24 similarly has a valve disk 30 to which is rigidly attached a stub shaft 32. The stub shafts 28 and 32 are journalled within the respective coupling halves 22 and 24 for rotation about a Y—Y axis which is mutually perpendicular to the X—X axis and Z—Z axis, the Y—Y axis constituting the axis of rotation of the composite valve.

The respective valve members 26 and 30, as illustrated in FIG. 5, each have a side face 26A, 30A, which are arranged in juxtaposition in the assembled condition of the coupling, the side faces being so configured that zero free space exists between those side faces in the assembled condition of the coupling.

FIG. 5 illustrates the side faces 26A and 30A as extending in a X,Y2 plane that extends transversely of the coupling and which extends through the X,Y,Z center of rotation of the valve members. While this planar relationship of the side faces is highly preferable, as will later appear, the respective side faces can be other than planar, and, can in fact be of any surface configuration that lies on a medial plane that extends through the chord of a sphere provided by the combined valve members 26 and 30, the medial plane crossing across the Y—Y axis.

Thus, any convenient angle 34 of the X, Y2 plane can be chosen relative to the X,Y plane, provided that it meets the condition that it extends through the periphery only of the chord of a sphere provided by the combined valve disks 26 and 30.

As is indicated by the dotted line B in FIG. 5, upon rotation of the composite valve disk through 90°, then, an area of the flow-through passage will be opened, with the composite valve disk intersecting that flow-through passage.

A major requirement of the embodiment of FIG. 5 is that the axis of the respective stub shafts 28 and 32 shall be truly coaxial one with the other in the assembled condition of the coupling so that the respective valve members are rotatable about a Y1—Y1 axis coincident with the Y—Y axis. This relationship of the axis of rotation of the respective valve disks 26 and 30 then provides for the chord of a sphere comprised by the combined valve disks 26 and 30 to rotate freely within spherical surfaces provided in the respective coupling halves 22 and 14, which themselves in combination constitute surfaces of a sphere.

Figure 6:
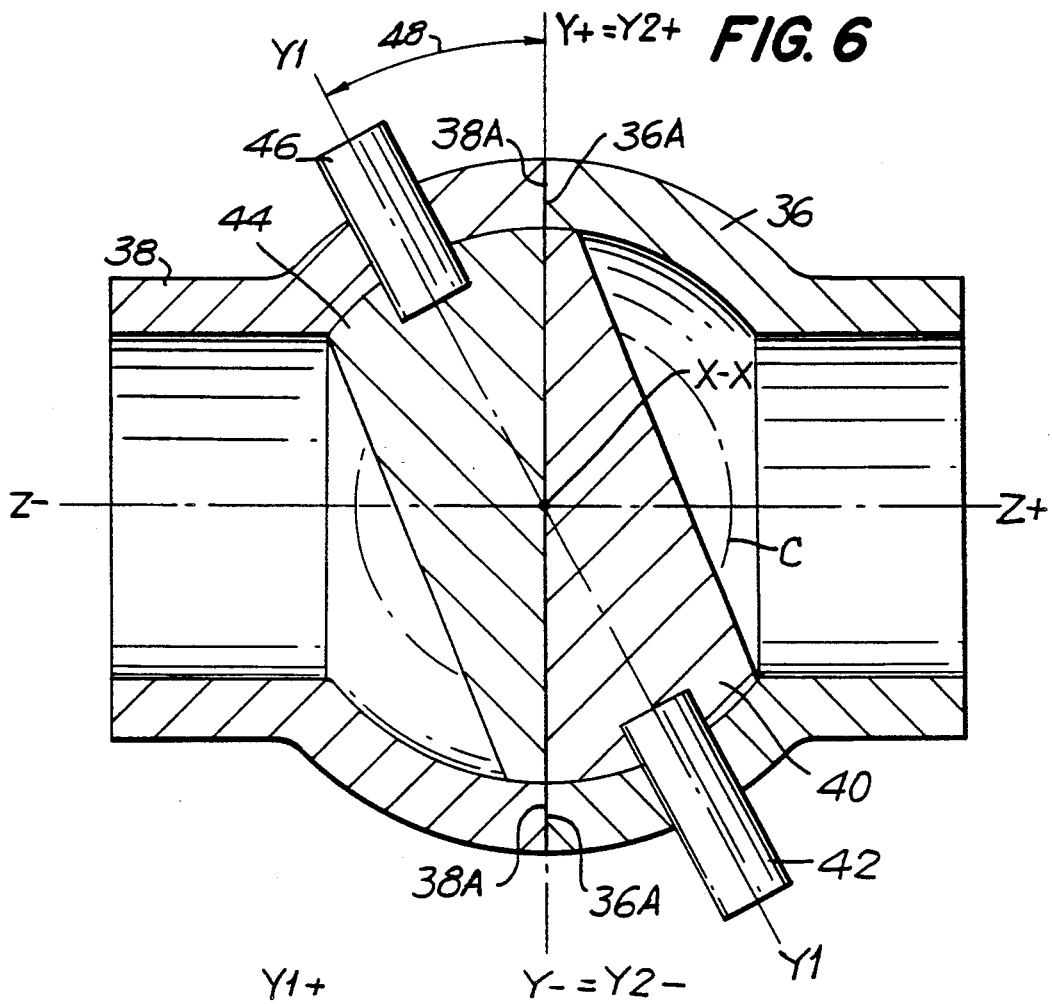
FIG. 6 is a diagrammatic cross-section through an alternative form of separable coupling according to the present invention, and which, more particularly, represents a development of the coupling of FIG. 5.
Figure 6A:
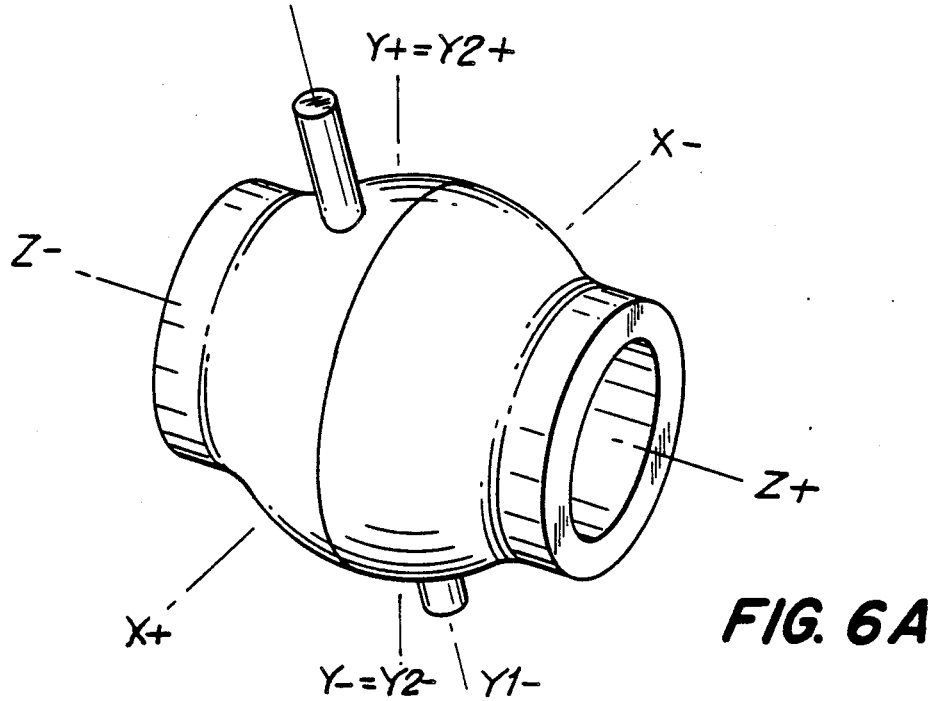
FIG. 6A being a perspective view thereof.

While it is essential that the axis of the respective stub shafts remain coaxial along the Y1—Y1 axis, it is not essential that the Y1—Y1 axis be coincident with the Y—Y axis. The Y1—Y1 axis can be displaced relative to the Y—Y axis, and, the X,Y2 plane can be displaced relative to the X,Y plane, provided that the symmetrical relationship of FIG. 5 is preserved. FIGS. 6 and 6A illustrate such a modification, in which the respective coupling halves 36 and 38 each include a valve member 40 and 44, respectively provided with stub shafts 42 and 46.

As will be observed, in FIG. 6 the Y1—Y1 axis has been rotated by an angle 48 in the Y+,Z− plane about the intersection of the X—X, Y—Y and Z—Z axes, and, the X,Y2 plane has been rotated about the intersection of the X—X, Y—Y and Z—Z axes for it to lie in the X,Y plane, thus preserving the same symmetry as in FIG. 5.

In FIG. 6, the coupling members 50 and 52, as in FIG. 5, are provided with inclined end faces 50A and 52A arranged in the general X, Y2 plane.

The respective valve members 54 and 58 include mating side faces 54A and 58A, the respective valve members being provided with stub shafts 56 and 60 that are rigidly attached to the associated valve member, and which, as in FIG. 5, have their longitudinal axis coincident with the Y—Y axis.

The respective valve members 54 and 58 each are cut away in planes extending parallel to the X, Y2 plane, thus reducing the thickness of the combined valve structure, while at the same time preserving the symmetry of FIG. 5 in its entirety. As will be observed, as related to the dotted line B representing the flow-through passage of the coupling, a very considerably increased cross-sectional area of the flow-through passage is provided.

Figure 7:
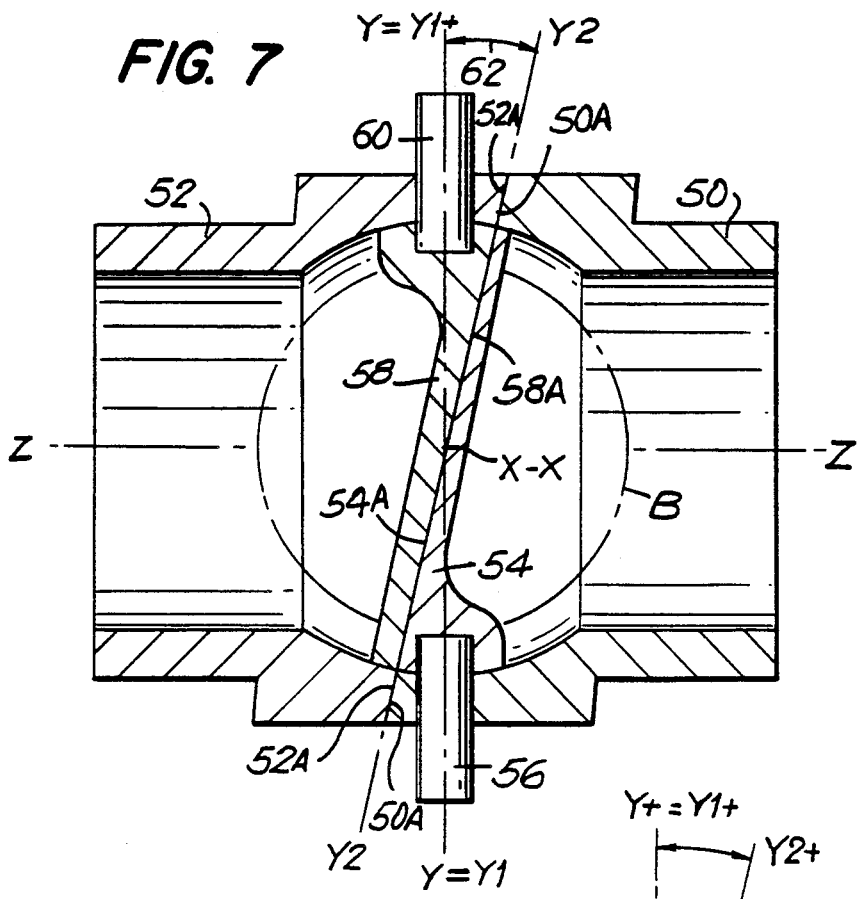
FIG. 7 is a diagrammatic cross-section through a separable coupling.
Figure 8:
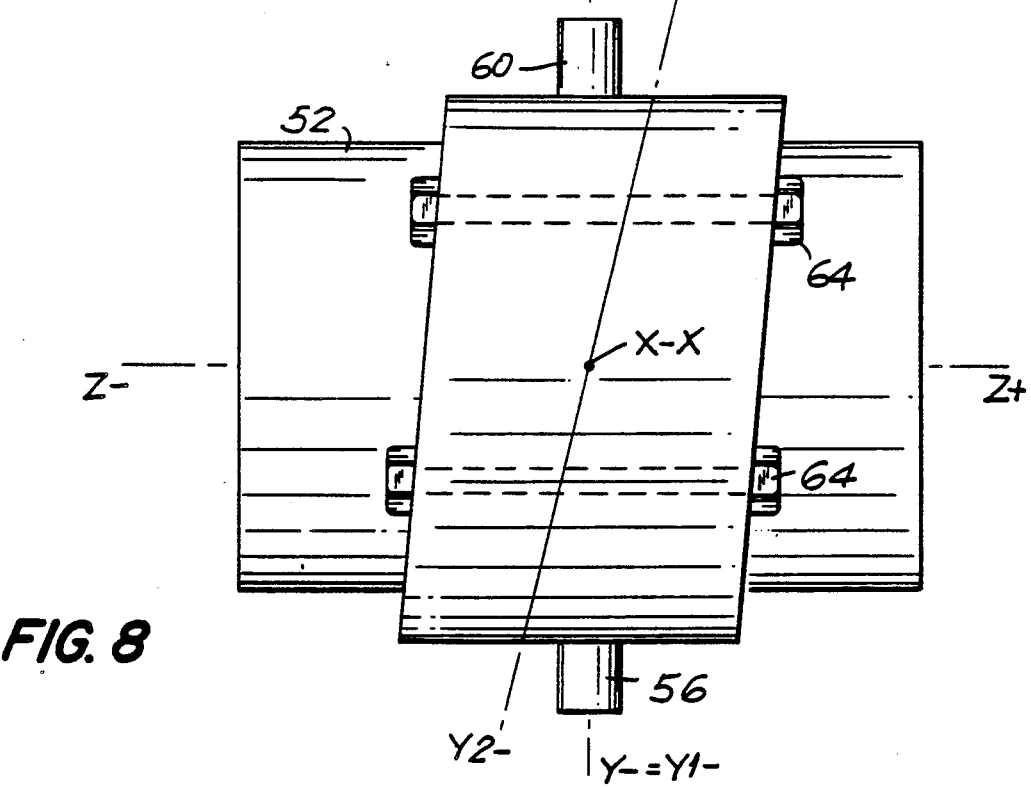
FIG. 8 is a front view of the separable coupling of FIGS. 5 or 6.

FIG. 7 diagrammatically illustrates a typical coupling formed from the coupling halves of either FIG. 5 or FIG. 6. In FIG. 7, the coupling is divided along a medial X,Y2 plane arranged at an angle 62 to the Y1—Y1 axis of the respective stub shafts 56 and 60. Conveniently, the respective coupling halves 50 and 52 are held secured one to the other by traction bolts 64. It will be appreciated that the traction bolts 64 represent only one of a multitude of alternative structures by means of which the coupling halves can be secured one to the other.

Figure 9:
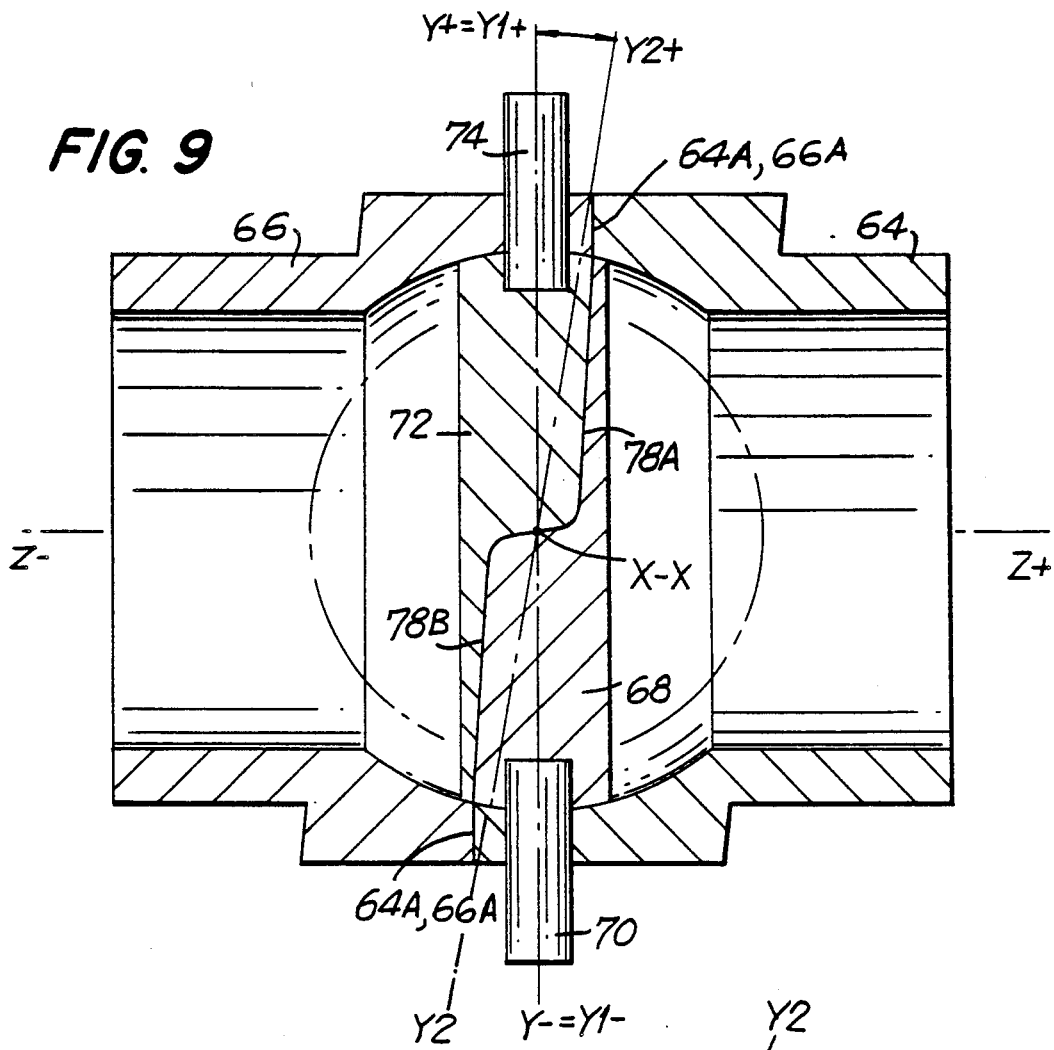
FIG. 9 is a diagrammatic cross-section through a separable coupling, similar to the one illustrated in FIGS. 5 and 8, and, illustrating a modification of the valve members.
Figure 10:
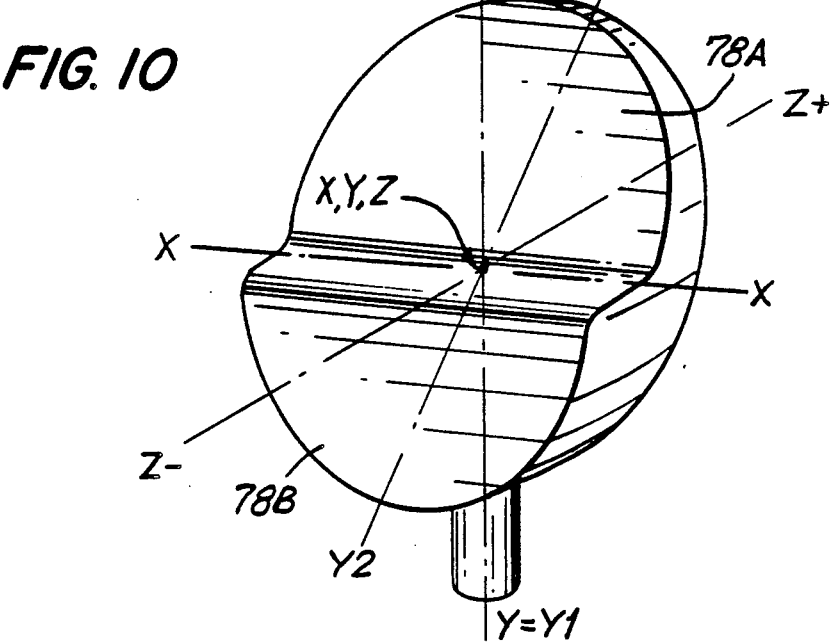
FIG. 10 is a perspective view illustrating a side face of one of the valve disk members of FIG. 9.
Figure 11:
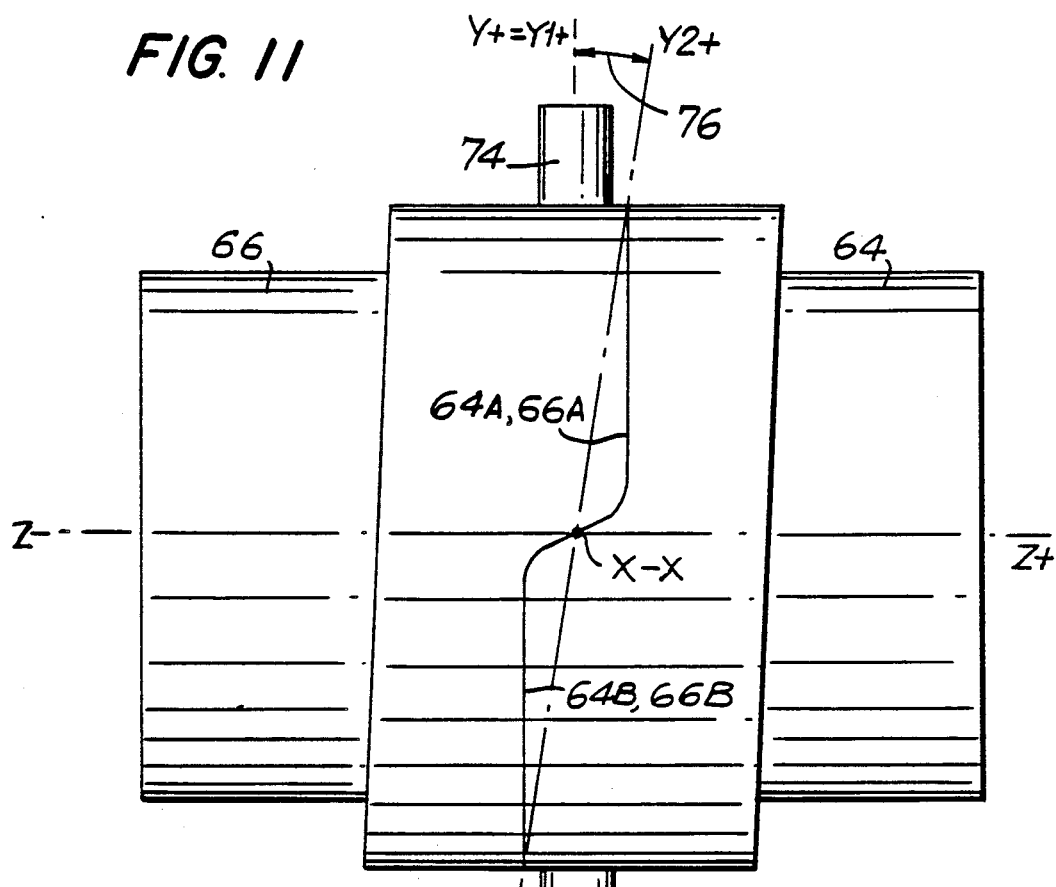
FIG. 11 is a front view of a separable coupling according to FIG. 9.

Referring now to FIGS. 9, 10 and 11, a structure of coupling deriving from FIGS. 5 and 6 is illustrated, in which the respective coupling halves 64 and 66 are separated along a general X,Y2 plane inclined with respect to the X,Y plane and the Y1 axis, and which meet at end faces 64A and 66A as in the FIG. 5 and 6 embodiments.

The respective valve members 68 and 72 are provided with stub shafts 70 and 74 as in the FIG. 5 and 6 embodiments, but, the mating side faces of the valve disks are other than in a truly planar relation. Instead, the side faces 78A and 78B of the valve disk are displaced to opposite sides of the X, Y2 plane, the side face portion 78A being displaced in the Z+ direction and the side face 78B being displaced in the Z— direction.

Such a configuration of side faces, while being different to the end faces 64A, 66A of the coupling halves 64 and 66 provides a symmetrical arrangement of the side faces that will interfit one with the other.

As illustrated in FIG. 11, the respective coupling members 64 and 66 themselves have end faces 64A, 66A corresponding in configuration to the configuration of the side faces 78A and 78B of the valve disks of FIG. 9. While this may be preferable, it is not essential that the end faces of the coupling members be configured identically with the side faces of the valve disks, for example, the valve disks can be configured as illustrated in FIGS. 9 and 10, and, the end faces of the coupling members 64 and 66 can be arranged in a sinusoidal surface as indicated by the chain dotted lines 64B, 66B in FIG. 11.

FIGS. 12 and 13 correspond generally with FIGS. 9 and 10, but illustrate a further modification of the valve disks.

In FIGS. 12 and 13, each of the valve disks 80 and 84 is provided with a stub shaft 82, 86 arranged with its longitudinal axis coincident with the Y—Y axis. The side faces of the respective valve disks 80 and 84 are configured for them to provide an interlocking key and socket configuration, as more clearly illustrated in FIG. 13. In FIG. 13, the valve disk 80 is shown as having a key 94 projecting from its side face, and, a socket 92 extending into its side face for the reception of a key 88 of the valve disk 84. The keys and sockets in the respective valve disks are arranged symmetrically on opposite sides of the X, Y plane, and act to lock the respective valve members one to the other upon assembly of the coupling and ensure positive positioning of the respective valve members relative to each other.

At this point, it will become clearly apparent that the side faces of the valve members can be of any configuration provided that it will allow for assembly of the respective valve members one to the other with the axis of the respective stub shafts coaxial one with the other. Similarly, the end faces of the coupling members can be configured in such a manner that they will only interfit in one specific position of rotation about their respective longitudinal axis.

Figure 14:
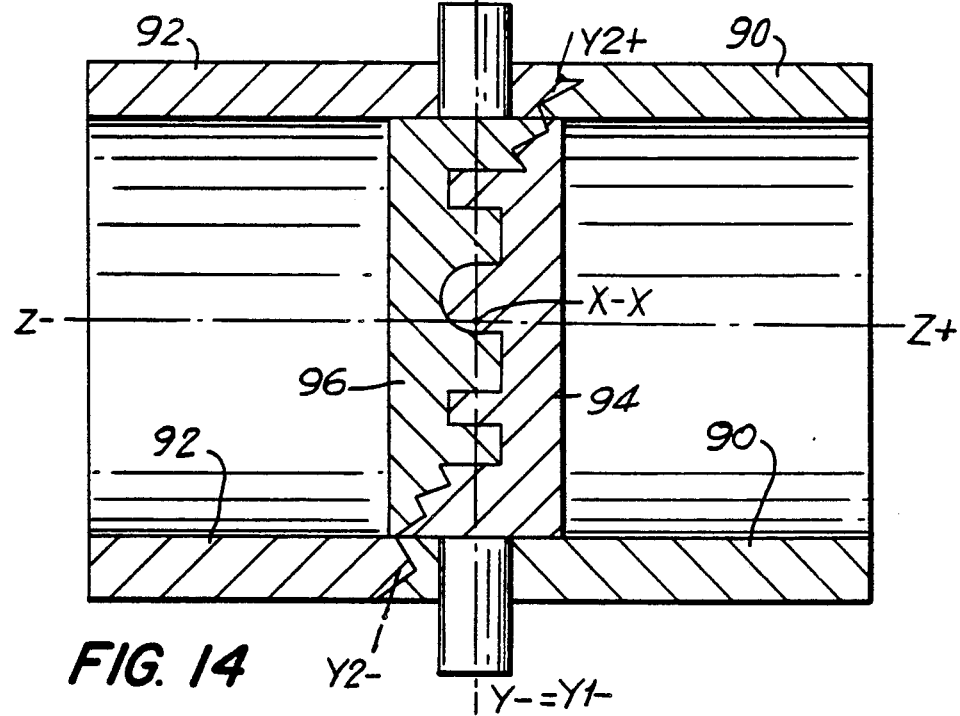
FIG. 14 is a diagrammatic illustration of an alternative form of coupling according to the present invention.

Illustrative of this is the diagrammatic representation of FIG. 14, in which the end faces of the coupling members 90 and 92 are shown as other than planar, and, the side faces of the respective valve disks 94 and 96 also are shown as dissimilar from each other, but, interfitting.

Further, in FIG. 14, the side faces of the respective valve disks at positions intermediate their peripheries can be arranged on opposite sides of a medial plane that includes the X, Y2 plane. Such modifications will, of course, produce asymmetry in the respective coupling halves, in turn dictating that only a specific coupling half can be connected to a corresponding coupling half. This, however, finds utility in certain applications in providing "keyed" couplings that will prevent assembly of a coupling member to all coupling members other than a specifically intended one.

In FIG. 15, the end face of a coupling member is indicated at 100, the side face 102 of the associated valve member being elliptical with the major axis of the ellipse lying along the Y—Y axis, and, the minor axis of the ellipse lying along the X—X axis. Such a configuration is symmetrical on each side of the Y—Y axis. Thus, another coupling member when inverted 180° about the X—X axis can be fitted to the first.

Figure 17:
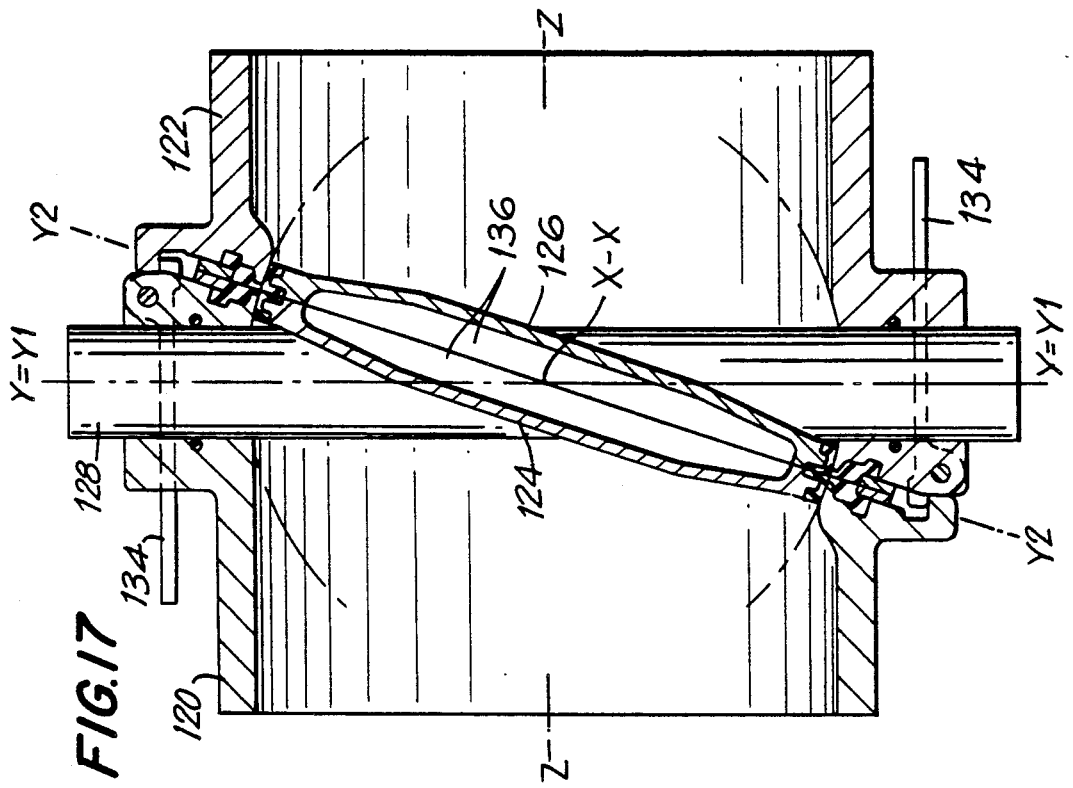
FIG. 17 illustrates two such coupling members as illustrated in FIG. 16, when in properly assembled relation.
Figure 16:
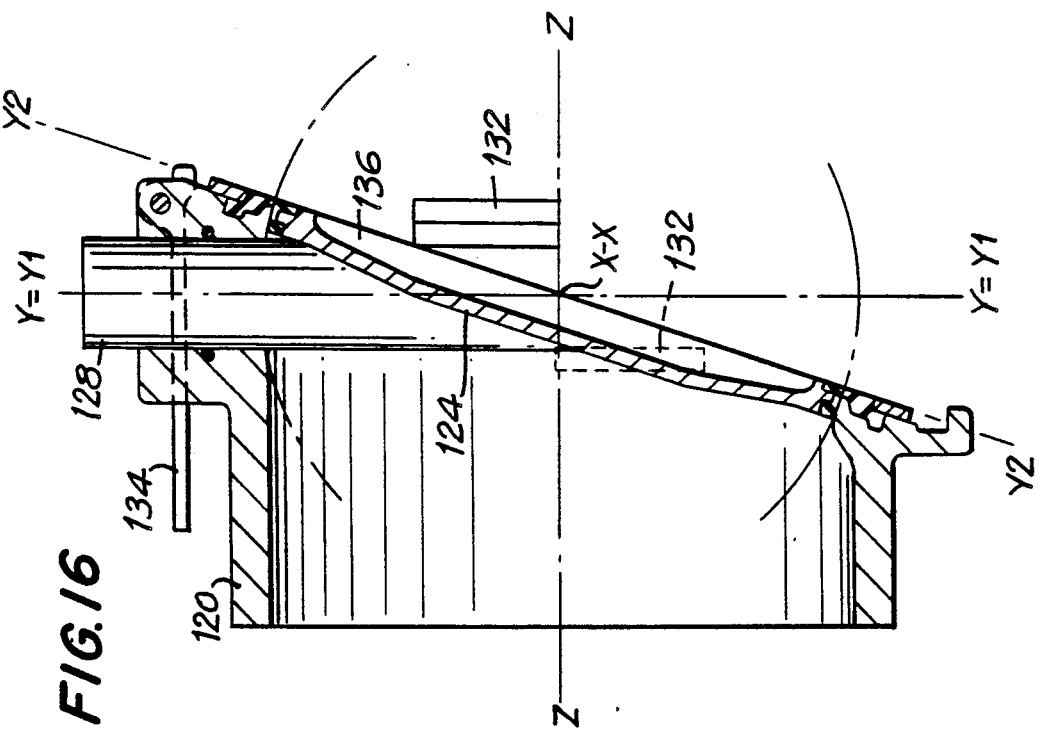
FIG. 16 is a longitudinal cross-section through a preferred form of coupling half according to the present invention.

Referring now to FIGS. 16 and 17, there is illustrated a commercial reduction to practice of the concepts and preferred embodiments previously referred to. In these figures the respective coupling half members are indicated at 120, 122, the respective valve disks are indicated at 124, 126, and, the respective stub shafts are indicated at 128, 130. In this embodiment, the valve disks 124, 126, and also, the operative end faces of the coupling members 120, 122 extend in a plane X, Y2 that is inclined relative to the X, Y plane, the respective stub shafts 128, 130 extending with their longitudinal axis coincident with the Y—Y axis.

In each of these figures, the valve disks are shown in the closed position of the associated coupling half, sealing members being provided at the outer periphery of the respective valve disk portions, and, between the juxtaposed faces of the respective coupling halves.

In this construction, as a result of rotation of the circular disk portions about a common center of revolution, the construction is that of a circular plate moving in a spherical surface.

In FIG. 16, latching surfaces 132 are illustrated that will interfit when a pair of coupling halves are correctly presented one to the other and are moved towards each other in the direction of the Y axis. Also, latching members 134 are illustrated which are operative to move the side faces of the coupling halves, and thus the side faces of the valve disk portions into intimate seating relationship one with the other in order to move the respective seals into the required compressed relationship.

While the side faces of the valve portions 124, 126 preferably are planar throughout their entire extent, due to the presence of the sealing members extending between the side faces of the respective valve disk portions, those valve disk portions can be cavitied as at 136, the possibility of conveyed fluid seeping into that cavity while the valve is in the open position being eliminated by the presence of the mutually presented side face seals.

Figure 18:
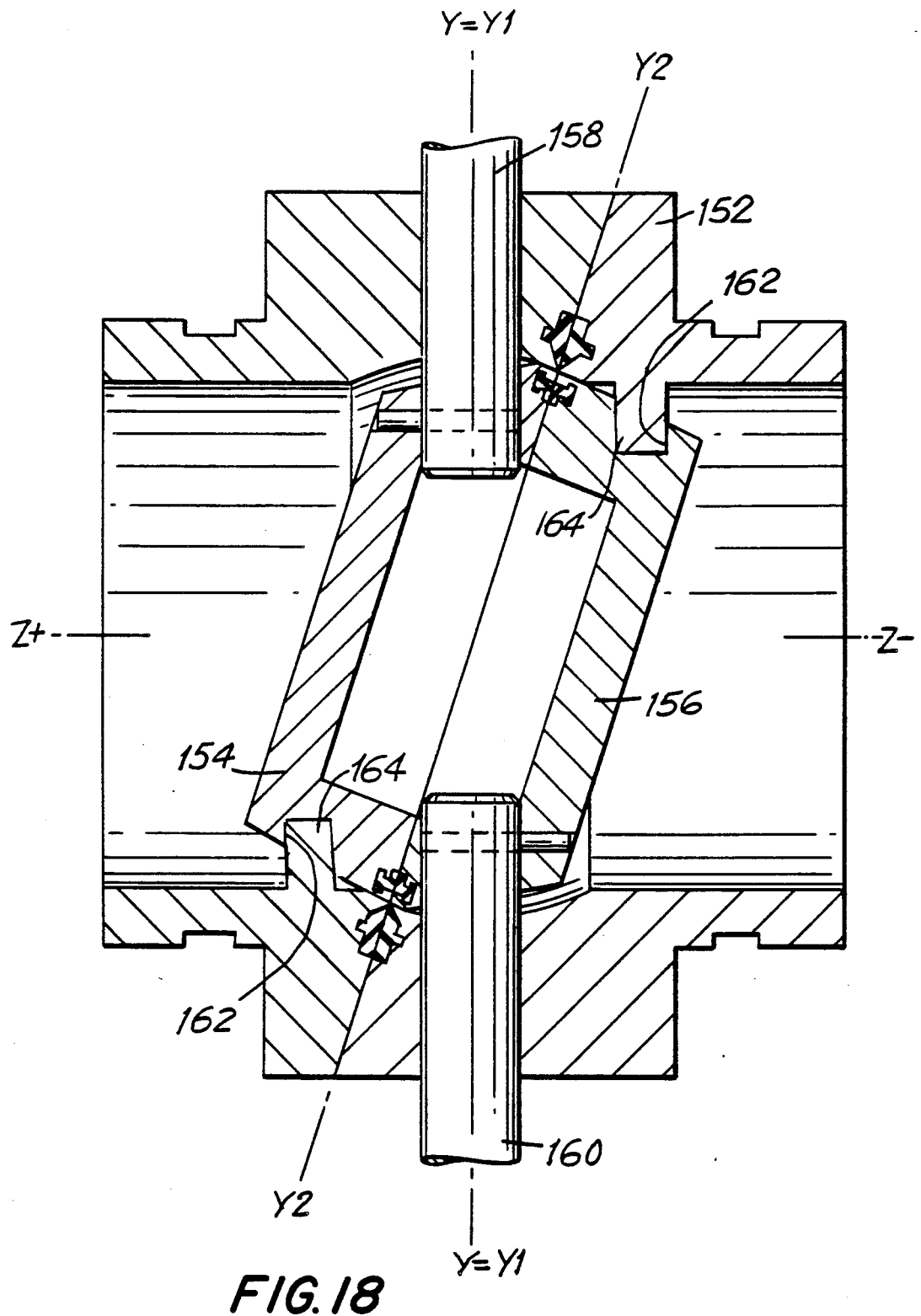
FIG. 18 is a longitudinal cross-section through an alternative form of separable coupling according to the present invention.
Figure 20:
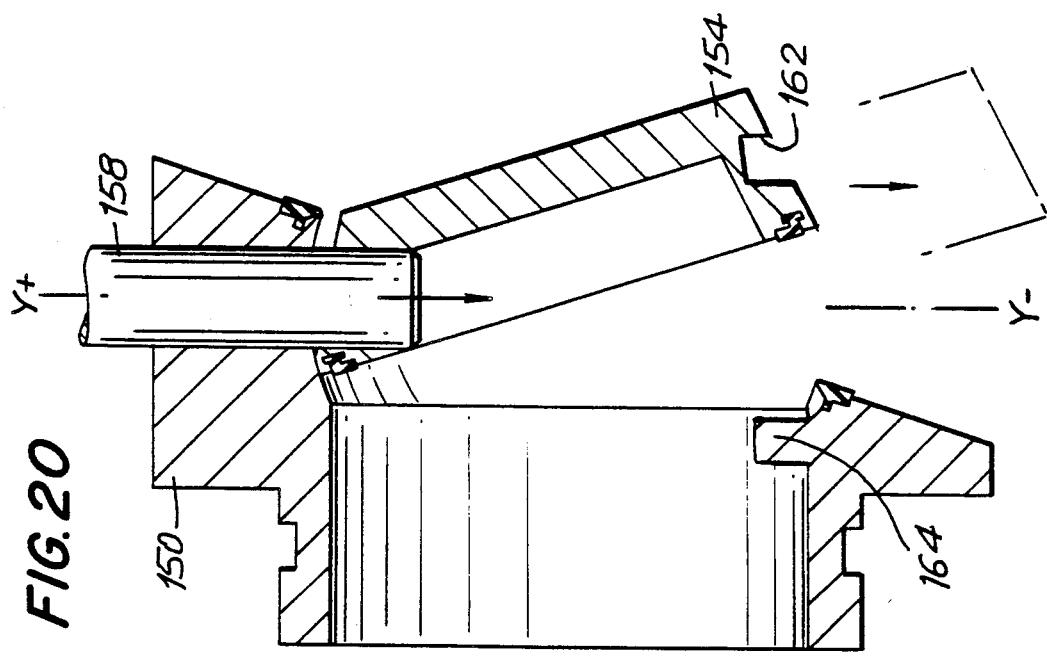
Figure 19:
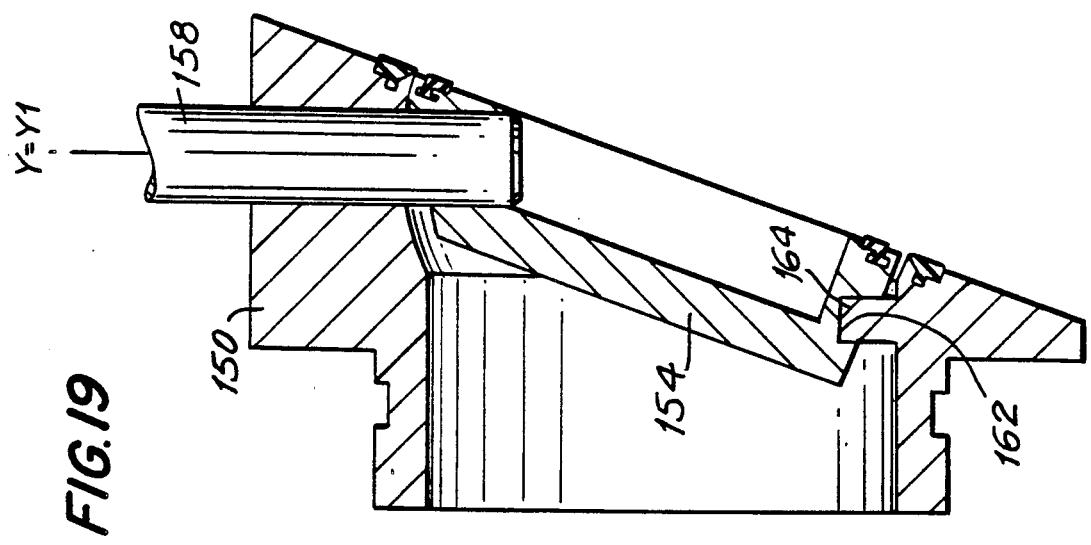
FIG. 19 is a longitudinal cross-section through one of the coupling halves of FIG. 18; and, FIG. 20 is a view corresponding with FIG. 19, and, illustrating the manner in which the valve disk of FIG. 19 can be inserted and removed from its associated coupling member.

FIGS. 18 through 20 illustrate another reduction to practice of a coupling according to the present invention.

In FIGS. 18 through 20, the coupling halves 150, 152 each contain a valve disk portion 154, 156, the respective valve disk portions being secured to stub shafts 158, 160. As will be understood, any convenient manner of turning the stub shafts can be employed. These figures each illustrate valve disk portions that are other than substantially planar disk members, and which are in fact cup shaped members providing a very substantial free volume within the combined valve disk portions. The presence of this free space within the combined valve disk portions is of no consequence, in that seepage into that cavity is prevented by seals extending peripherally of the respective valve disk portions.

FIG. 18 illustrates a coupling intended for high pressure uses in which a considerable force may exist at the opposite side faces of the valve disk portions when the valve is in a closed position.

In such applications, the periphery of the respective valve disk portions opposite the associated stub shaft can be provided with an arcuate groove 162 concentric with the axis of the associated stub shaft 158 or 160, and which receives an arcuate key 164 provoded on the associated coupling half. As the respective valve portions are moving truly arcuately about the Y—Y axis, the keys 162 can traverse their associated arcuate keyways 164, this providing further support for the respective valve disk portions. It will, however, be noted that the stub shafts 158 and 160 themselves provide abutments minimizing or eliminating displacement of the valve portions in the direction of the Z—Z axis, without regard to which direction the force is applied along the Z—Z axis, i.e., either in the Z+ or in the Z− direction.

Instead of being cavitied, the respective valve portions can be solid, and for certain applications preferably are solid, in order that they present a truly planar face extending in the X-Y2 plane. In this manner, a planar face is provided on the respective coupling members at the time they are separated with the respective valve portions in their closed positions, which greatly facilitates removal from the planar end face of any debris that may have become adhered to that face prior to reassembly of the coupling.

Further, and as illustrated in FIG. 20, if servicing of the valve member is required, this can be accomplished with the greatest of ease and facility by rotating the valve portion 154 through an angle of 180° about the axis of its associated stub shaft 158 from the position shown in FIG. 19, this providing for complete removal of the disk valve portion 154 and its associated stub shaft 158 by sliding the stub shaft 158 in the Y− direction.

In each of the embodiments of FIGS. 4A-4F, 4G, 5 and 8-20, provided that the axis Y1—Y1 of the valve actuating shaft is coaxial with the Y—Y axis of the coupling, then, movement of the valve between a fully opened and a fully closed position will be exactly 90°, plus or minus minor deviations arising from manufacturing tolerances. As shown in FIGS. 4G, 6 and 6A, the valve actuating shaft will be required to move through an angle of more than 90° but lower than 180° in order to move the valve between a fully opened and a fully closed position. The closer the axis Y1—Y1 is moved towards coaxial relationship with the Y—Y axis, the smaller will be the deviation from actual 90° rotation of the valve actuating lever between the opened and the closed positions of the valve.

As will be appreciated, the concepts and preferred embodiments of the present invention as previously described are capable of reduction to practice in a myriad of different forms as dictated by specific requirements and the intended usage of the coupling, such as readily will suggest themselves to persons skilled in the art.

I claim:

1. A nominally one quarter turn valve controlled coupling member for use in connecting a conduit to another member provided with a corresponding said valve controlled coupling member to provide a dry break coupling that has substantially zero spillage upon separation of the respective coupling members, said coupling member comprising:

a valve body having a fluid passage extending therethrough, said fluid passage defining a longitudinal axis comprising a Z axis of said coupling;

said body having an end face extending in a plane transverse to said Z axis and which passes through an X axis of said coupling;

a valve member positioned within said fluid passage, said valve member having a side face which in one position of said valve member provides a continuation of said end face of said body;

said valve member having its center positioned at the intersection of said X, Y and Z axes;

sealing means interposed between said body and said valve member, said sealing means providing a fluid tight seal between said valve member and said body at least when said valve member is in said one position; and, a shaft extending through said valve body, said shaft having a longitudinal axis intersecting the intersection of said X, Y and Z axes, and which extends nominally coaxial with said Y—Y axis within a range of plus or minus 10°, said shaft having an end rigidly secured to said valve member, said shaft being rotatable in said valve body and being operative to move said valve member through an angle of nominally 90° from said first position to a second fully opened position providing for minimal restriction of fluid flow through said passage and past said valve member.

2. The coupling member of claim 1, in combination with another coupling member having an identically formed end face, valve member and rotary shaft, said respective coupling members having been presented to each other with one of said coupling members inverted 180° about the Z axis and with the axis of said respective shafts coaxial one with the other, whereby the respective planar end faces of said valve bodies are in juxtaposition, and said side faces of said valve members are in juxtaposition; further including:

means for rigidly securing said respective valve bodies one to the other;

whereby, rotation of one of said shafts is transmitted through said side face of its associated valve member and is operative to rotate the other of said valve members and its associated shaft, and thus provide for fluid flow through the flow passage of said respective coupling members.

3. The valve of claim 1, in which said sealing means is provided by an elastomeric seal supported on said valve member, said seal extending peripherally of said side face.

4. The coupling member of claim 1, in combination with another coupling member having an identically formed end face, valve member and rotary shaft, in which said sealing means on each said valve member is provided by an elastomeric seal extending peripherally of said side face of said respective valve member, said respective side faces each comprising a diameter of said imaginary sphere.

5. The coupling member of claim 1, in which said sealing means includes an elastomeric seal surrounding said bore in said valve body, and which extends in the plane of said inclined end face.

6. The coupling member of claim 1, in combination with another coupling member having an identically formed end face, valve member and rotary shaft, in which said sealing means includes an elastomeric seal surrounding said respective bores of said respective valve bodies, and which each extend in the plane of said inclined end face, said sealing means engaging one with the other in sealing relation upon the rigid securement of said respective valve bodies one to the other.

7. The valve controlled coupling member of claim 1, in which said sealing means is provided by an elastomeric seal extending peripherally of said side face of said valve member, said side face comprising a diameter of said imaginary sphere; and,
    an elastomeric seal surrounding said bore of said valve body and which extends in the plane of said inclined end face;
    said respective sealing means on said valve body and on said valve member cooperating one with the other when said valve member is in said one position.

8. The coupling member of claim 1, in combination with another coupling member having an identically formed end face, valve member, and rotary shaft, in which said sealing means is provided by an elastomeric seal extending peripherally of said side face of each said valve member, said respective side faces comprising a diameter of said imaginary sphere, and in which said sealing means further includes an elastomeric seal surrounding said bore of said respective valve bodies and which extend in the plane of said inclined end face of the associated said valve body, said respective seal means engaging each other in compressive relationship upon the rigid securement of said respective valve bodies one to the other.

9. The coupling member of claim 1, in which said side face of said valve member is continuous and planar, and, said end face of said valve body is continuous and planar, said respective planar faces being co-planar one with the other in a closed position of said valve member.

10. The coupling member of claim 1, in combination with another coupling member having an identically formed end face, valve member and rotary shaft, in which said side face of said respective valve members are continuous and planar, and, said end faces of said respective valve bodies are continuous and planar, said planar end faces being co-planar with each other, whereby, upon the securement of said coupling members one to the other, said side faces of said respective valve members are placed in co-planar juxtaposition, and, said planar end faces of said respective valve bodies are placed in co-planar juxtaposition, whereby, an absolute minimum of free space exists between said respective side faces of said valve members, thus minimizing to the greatest possible extent the volume of any seepage that may occur between said juxtaposed planar side faces.

11. The coupling member of claim 1, further including sealing means extending peripherally of said shaft and operative to prevent leakage in the axial direction of said shaft.

12. The coupling of claim 1, in combination with another coupling member having an identically formed end face, valve member and rotary shaft, further including sealing means extending peripherally of each of said shafts and operative to prevent leakage axially of said respective shafts.

13. The coupling member of claim 1, further including means for rigidly securing said valve body to a correspondingly formed valve body, said means being comprised by a bayonet socket provided on said valve body, and a locking tongue provided on said valve body at a position diametrically opposite said bayonet socket.

14. The coupling member of claim 1, in combination with another coupling member having an identiclly formed end face, valve member and rotary shaft, in which said means for rigidly securing said valve bodies to each other is comprised by a bayonet socket provided on each said valve body, and a locking tongue provided on each said valve body at a position diametrically opposite said bayonet socket, the locking tongue of each said valve body being received within the bayonet socket of the opposite said valve body.

15. The coupling member of claim 1, in which said locking tongue and said bayonet socket include inclined camming surfaces operative to cam said valve body into juxtaposition with another coupling member having an identically formed end face, valve member, rotary shaft, locking tongue and bayonet socket.

16. The coupling member of claim 1, in combination with another coupling member having an identically formed end face, valve member and rotary shaft, further including cooperating camming surfaces on each said locking tongue and bayonet socket for moving said respective end faces of said respective coupling members into juxtaposition one with the other upon securement of said coupling members one to the other.

17. The coupling member of claim 1, in which said securement means includes a toggle linkage secured at one of its ends to said valve body, and, which is provided for operative coaction with another coupling member having an identically formed end face, valve member, rotary shaft and toggle linkage.

18. The coupling member of claim 1, in combination with another coupling member having an identically formed end face, valve member and rotary shaft, in which each said coupling member further includes a toggle linkage attached at one of its ends to the valve body of that coupling member, the other end of said toggle linkage being for operative coaction with the valve body of the opposite coupling member.

19. A nominally quarter turn valve controlled coupling member for use with an oppositely configured nominally quarter turn valve controlled coupling member, to provide, in combination, a disk valve:
    said respective coupling members each comprising a portion of a complete disk valve assembly that has been divided by surfaces commencing in one of a $Y+$, $Z+$ and $Y+$, and $Z-$ quadrant, and which extends through the outer periphery of a valve disk of said valve, and which passes through a Y—Y axis of rotation of said disk, and, which terminates in the opposite Y—, Z— and Y—, Z+ quadrant; whereby, each section of said valve disk includes a portion of the outer periphery of said valve disk prior to the division of that disk.

20. The valve controlled coupling member of claim 19, in which said surface of division lies completely within said valve disk, and deviates from the medial XY plane, any deviation from planar in the X+, Y+ quadrant being duplicated reverse in the X—, Y— quadrant, and, any deviation in the X—, Y+ quadrant being duplicated in reverse in the X+, Y— quadrant, whereby the juxtaposed sides of said valve disk portions will interfit in a first position, and, in a second position rotated 180° in the XY plane.

* * * * *